US012781051B2

(12) United States Patent
Katou et al.

(10) Patent No.: US 12,781,051 B2
(45) Date of Patent: Nov. 3, 2026

(54) COMPOSITION, DICHROIC SUBSTANCE, LIGHT ABSORPTION ANISOTROPIC FILM, LAMINATE, AND IMAGE DISPLAY DEVICE

(71) Applicant: FUJIFILM Corporation, Tokyo (JP)

(72) Inventors: Takashi Katou, Kanagawa (JP); Yasuhiro Ishiwata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1060 days.

(21) Appl. No.: 16/556,765

(22) Filed: Aug. 30, 2019

(65) Prior Publication Data

US 2019/0382586 A1 Dec. 19, 2019

Related U.S. Application Data

(63) Continuation of application No. PCT/JP2018/009133, filed on Mar. 9, 2018.

(30) Foreign Application Priority Data

Mar. 9, 2017 (JP) ................................ 2017-045296

(51) Int. Cl.
*C09B 31/22* (2006.01)
*C09B 29/033* (2006.01)
(Continued)

(52) U.S. Cl.
CPC .......... *C09B 29/0085* (2013.01); *C09B 31/22* (2013.01); *C09B 31/26* (2013.01);
(Continued)

(58) Field of Classification Search
CPC ..... C09B 29/0085; C09B 31/22; C09B 31/26; C09B 31/062; C09B 35/38; C09B 43/28;
(Continued)

(56) References Cited

U.S. PATENT DOCUMENTS

| | | | |
|---|---|---|---|
| 4,115,380 | A | 9/1978 | Schladetsch et al. |
| 4,724,259 | A | 2/1988 | Etzbach et al. |
| 2017/0298350 | A1 | 10/2017 | Eveleth et al. |

FOREIGN PATENT DOCUMENTS

| | | | |
|---|---|---|---|
| DE | 3342040 | A1 * | 5/1985 |
| JP | 52-129731 | A | 10/1977 |

(Continued)

OTHER PUBLICATIONS

Green et al. "CCXXII.—The alkaline condensations of nitrohydrazo-compounds. Part I" Journal of the Chemical Society, Transactions, 1911, vol. 99, pp. 1960-1972.*

(Continued)

*Primary Examiner* — Matthew P Coughlin
*Assistant Examiner* — Ashli A Chicks
(74) *Attorney, Agent, or Firm* — Edwards Neils LLC; Jean C. Edwards, Esq.

(57) ABSTRACT

An object of the invention is to provide a dichroic substance capable of forming a light absorption anisotropic film having excellent light fastness, a composition, a light absorption anisotropic film formed of the composition, a laminate, and an image display device. A composition according to the embodiment of the invention is a composition containing a dichroic substance having an azo group, and the dichroic substance exhibits a highest occupied molecular orbital energy level of −5.60 eV or less and a CLogP value of 7.0 or greater.

8 Claims, 1 Drawing Sheet

(51) Int. Cl.
*C09B 31/26* (2006.01)
*G02B 5/22* (2006.01)
*G02B 5/30* (2006.01)
*G02F 1/1335* (2006.01)

(52) U.S. Cl.
CPC ........... *G02B 5/223* (2013.01); *G02B 5/3033* (2013.01); *G02F 1/133509* (2013.01); *C09K 2323/031* (2020.08); *G02F 2202/04* (2013.01)

(58) Field of Classification Search
CPC ........ G02B 5/223; G02B 5/3033; G02B 5/30; G02F 1/133509; G02F 2202/04; G02F 1/1335; C09K 2323/031
See application file for complete search history.

(56) References Cited

FOREIGN PATENT DOCUMENTS

| | | | | | |
|---|---|---|---|---|---|
| JP | 56-057850 | A | | 5/1981 | |
| JP | 60-124658 | A | | 7/1985 | |
| JP | 63-301850 | A | | 12/1988 | |
| JP | 05-059293 | A | | 3/1993 | |
| JP | 05-132628 | A | | 5/1993 | |
| JP | 06-157927 | A | | 6/1994 | |
| JP | 06-256675 | A | | 9/1994 | |
| JP | 06-256676 | A | | 9/1994 | |
| JP | 10-088142 | A | | 4/1998 | |
| JP | 10-088143 | A | | 4/1998 | |
| JP | 2004-029201 | A | | 1/2004 | |
| JP | 2006-124611 | A | | 5/2006 | |
| JP | 2011-057927 | A | | 3/2011 | |
| JP | 2012-128000 | A | | 7/2012 | |
| JP | 2013249319 | A | * | 12/2013 | |
| JP | 2017-76930 | | * | 4/2017 | |
| WO | 2016/054616 | A1 | | 4/2016 | |
| WO | 2016/133218 | A1 | | 8/2016 | |
| WO | WO-2018186503 | A1 | * | 10/2018 | .............. C08J 7/042 |

OTHER PUBLICATIONS

CAS Registry No. 16432-68-1 (Year: 1984).*
CAS Accession No. 97987-21-8 (Year: 1985).*
Semiempirical methods, updated Aug. 31, 2021, obtained from https://sites.google.com/site/orcainputlibrary/semiempirical-methods on Jul. 24, 2024. (Year: 2021).*
CAS Registry No. 4007-22-1, entered on Nov. 16, 1984. (Year: 1984).*
Notice of Reasons for Revocation, issued by Japanese Patent Office on Jul. 29, 2022, in connection with corresponding Japanese Patent Application No. 2019-503865.
International Search Report issued in PCT/JP2018/009133 on May 22, 2018.
Written Opinion issued in PCT/JP2018/009133 on May 22, 2018.
International Preliminary Report on Patentability completed by WIPO on Sep. 10, 2019 in connection with International Patent Application No. PCT/JP2018/009133.
Ogihara, Atsushi et al., The effect of chemical composition on the rates of oxidative decomposition of azo compounds, The Journal of the Society of Chemical Industry, Japan, 1959, 62 (7), pp. 1011-1014.
Nakazumi, Hiroyuki, Fading degradation of organic dyestuffs, Journal of the Japan Society of Color Material, 1990, 63 (11), 677-684.
Matsuoka, Masaru, et al., Photofading reaction of some disperse azodyes, The Journal of the Society of Chemical Industry, Japan, 1971, 74 (8), 1655-1660.
Sumiyoshi Mitsukuni, Organic dyestuffs and molecular design, Fine Chemical, 1984, 13 (21), 3-16.
Qian, H. F. et al., Structure-property relationships for azo disperse dyes on polyurethane fibre, Coloration Technology, 2009, 125, 146-150.
Office Action, issued by the Korean Intellectual Property Office on Jul. 5, 2021, in connection with Korean Patent Application No. 10-2019-7026030.
Office Action, issued by the State Intellectual Property Office on Feb. 23, 2021, in connection with Chinese Patent Application No. 201880016772.0.
Office Action, issued by the State Intellectual Property Office on May 18, 2021, in connection with Chinese Patent Application No. 201880016772.0.
Office Action, issued by the State Intellectual Property Office on Aug. 11, 2021, in connection with Chinese Patent Application No. 201880016772.0.
Office Action, issued by the Japanese Patent Office on Oct. 6, 2020, in connection with Japanese Patent Application No. 2019-503865.
Office Action, issued by the State Intellectual Property Office on Sep. 24, 2020, in connection with Chinese Patent Application No. 201880016772.0.
Office Action, issued by the Korean Intellectual Property Office on Jan. 19, 2021, in connection with Korean Patent Application No. 10-2019-7026030.
Office Action, issued by the State Intellectual Property Office on Nov. 9, 2021, in connection with Chinese Patent Application No. 201880016772.0.
Notice of Reasons for Revocation, issued by Japanese Patent Office on Jan. 4, 2023, in connection with Japanese Patent Application No. 2019-503865.

* cited by examiner

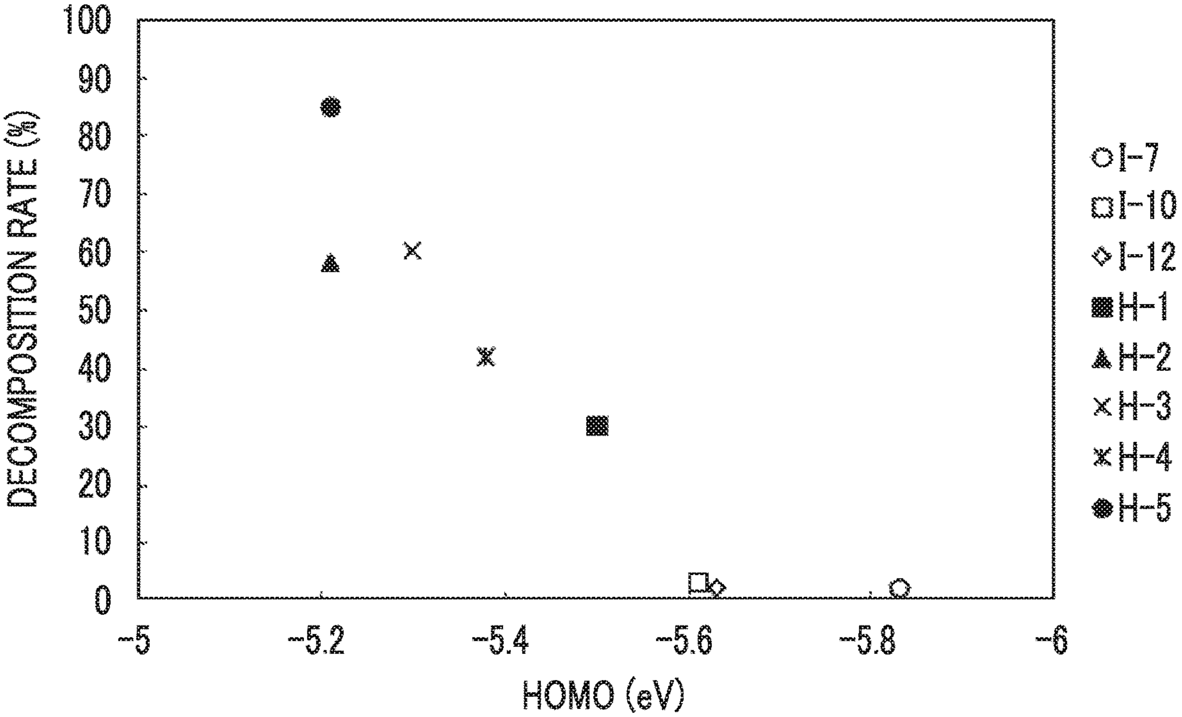
100
90
80
70
60
50
40
30
20
10
0
DECOMPOSITION RATE (%)
−5
−5.2
−5.4
−5.6
−5.8
−6
HOMO (eV)
I-7
I-10
I-12
H-1
H-2
H-3
H-4
H-5

COMPOSITION, DICHROIC SUBSTANCE, LIGHT ABSORPTION ANISOTROPIC FILM, LAMINATE, AND IMAGE DISPLAY DEVICE

CROSS-REFERENCE TO RELATED APPLICATIONS

This application is a Continuation of PCT International Application No. PCT/JP2018/009133 filed on Mar. 9, 2018, which was published under PCT Article 21(2) in Japanese, and which claims priority under 35 U.S.C. § 119(a) to Japanese Patent Application No. 2017-045296 filed on Mar. 9, 2017. The above applications are hereby expressly incorporated by reference, in their entirety, into the present application.

BACKGROUND OF THE INVENTION

1. Field of the Invention

The present invention relates to a composition, a dichroic substance, a light absorption anisotropic film, a laminate, and an image display device.

2. Description of the Related Art

In the past, devices which are operated by different principles for each function have been used in a case where an attenuation function, a polarization function, a scattering function, a shielding function, or the like is required in relation to irradiated light including laser light and natural light. Therefore, products corresponding to the above-described functions have been manufactured through different manufacturing processes for each function.

For example, in liquid crystal displays (LCDs), a linearly polarizing plate or a circularly polarizing plate is used to control optical activity and a birefringent property in display. In addition, in organic light emitting diodes (OLEDs), a circularly polarizing plate is used to prevent external light from being reflected.

Iodine has been widely used as a dichroic substance in these polarizing plates (polarizing elements). However, a polarizing element using an organic dye as a dichroic substance instead of iodine has also been examined.

For example, in WO2016/054616A, a composition containing a dichroic substance having a bisazo structure and a polymerizable smectic liquid crystal compound is described ([claim 1]).

SUMMARY OF THE INVENTION

The inventors have examined a light absorption anisotropic film containing the dichroic substance described in WO2016/054616A, and found that depending on the kind of the dichroic substance contained in the composition used to form the light absorption anisotropic film, the light absorption anisotropic film may have insufficient light fastness.

Accordingly, an object of the invention is to provide a dichroic substance capable of forming a light absorption anisotropic film having excellent light fastness, a composition, a light absorption anisotropic film formed of the composition, a laminate, and an image display device.

As a result of intensive studies for achieving the object, the inventors have found that a light absorption anisotropic film having a high alignment degree can be formed using a dichroic substance having an azo group and exhibiting a highest occupied molecular orbital energy level of −5.60 eV or less, and completed the invention.

That is, the inventors have found that the object can be achieved with the following configuration.

[1] A composition comprising: a dichroic substance having an azo group, in which the dichroic substance exhibits a highest occupied molecular orbital energy level of −5.60 eV or less and a CLogP value of 7.0 or greater.

[2] The composition according to [1], in which the dichroic substance is represented by Formula (1) to be described later.

In Formula (1) to be described later, m1, m2, and m3 each independently represent an integer of 0 to 5, and n1 represents an integer of 1 to 4.

In Formula (1) to be described later, $Ar^1$ represents an aromatic hydrocarbon ring or heterocyclic ring having a valence of (m1+1), $Ar^2$ represents an aromatic hydrocarbon ring or heterocyclic ring having a valence of (m2+2), $Ar^3$ represents an aromatic hydrocarbon ring or heterocyclic ring having a valence of (m3+1), and in a case of n1≥2, a plurality of $Ar^2$'s may be the same or different.

In Formula (1) to be described later, $R^1$, $R^2$, and $R^3$ each independently represent a substituent, in a case of m1≥2, a plurality of $R^1$'s may be the same or different, in a case of m2≥2, a plurality of $R^2$'s may be the same or different, in a case of m3≥2, a plurality of $R^3$'s may be the same or different, in a case of n1≥2, a plurality of $-(R^2)_{m2}$'s may be the same or different, and a total number of substituents selected from the group consisting of $R^1$, $R^2$, and $R^3$ is 2 or more.

[3] The composition according to [2], in which $Ar^1$, $Ar^2$, and $Ar^3$ in Formula (1) to be described later each independently represent a benzene ring or a thienothiazole ring.

[4] The composition according to [2] or [3], in which in Formula (1) to be described later, two or more substituents selected from the group consisting of $R^1$, $R^2$, and $R^3$ are electron-withdrawing groups.

[5] The composition according to any one of [1] to [4], in which a maximum absorption wavelength of the dichroic substance to be described later is within a range of 400 to 500 nm.

[6] The composition according to any one of [1] to [5], further comprising: a liquid crystalline compound.

[7] A light absorption anisotropic film which is formed using the composition according to any one of [1] to [6].

[8] A laminate comprising: a base; and the light absorption anisotropic film according to [7] which is provided on the base.

[9] The laminate according to [8], further comprising: a λ/4 plate which is provided on the light absorption anisotropic film.

[10] An image display device comprising: the light absorption anisotropic film according to [7]; or the laminate according to [8] or [9].

[11] A dichroic substance which is represented by Formula (1) to be described later, and exhibits a highest occupied molecular orbital energy level of −5.60 eV or less and a CLogP value of 7.0 or greater.

In Formula (1) to be described later, m1, m2, and m3 each independently represent an integer of 0 to 5, and n1 represents an integer of 1 to 4.

In Formula (1) to be described later, $Ar^1$ represents an aromatic hydrocarbon ring or heterocyclic ring having a valence of (m1+1), $Ar^2$ represents an aromatic hydrocarbon ring or heterocyclic ring having a valence of (m2+2), $Ar^3$ represents an aromatic hydrocarbon ring or heterocyclic ring having a valence of (m3+1), and in a case of n1≥2, a plurality of $Ar^2$'s may be the same or different.

In Formula (1) to be described later, $R^1$, $R^2$, and $R^3$ each independently represent a substituent, in a case of m1≥2, a plurality of $R^1$'s may be the same or different, in a case of m2≥2, a plurality of $R^2$'s may be the same or different, in a case of m3≥2, a plurality of $R^3$'s may be the same or different, in a case of n1≥2, a plurality of $-(R^2)_{m2}$'s may be the same or different, and a total number of substituents selected from the group consisting of $R^1$, $R^2$, and $R^3$ is 2 or more.

[12] The dichroic substance according to [11], in which the dichroic substance represented by Formula (1) to be described later is a dichroic substance represented by Formula (2) to be described later.

In Formula (2) to be described later, m21 and m23 each independently represent an integer of 0 to 5, m22 represents an integer of 0 to 4, and n2 represents an integer of 2 or 3.

In Formula (2) to be described later, $R^{21}$, $R^{22}$, and $R^2$ each independently represent a substituent, a plurality of $-(R^{22})_{m22}$'s may be the same or different, in a case of m21≥2, a plurality of $R^{21}$'s may be the same or different, in a case of m22≥0.2, a plurality of $R^{22}$'s may be the same or different, in a case of m23≥2, a plurality of $R^{23}$'s may be the same or different, a total number of substituents selected from the group consisting of $R^{21}$, $R^{22}$, and $R^{23}$ is 2 or more, and two or more substituents are electron-withdrawing groups.

According to the invention, it is possible to provide a dichroic substance capable of forming a light absorption anisotropic film having excellent light fastness, a composition, a light absorption anisotropic film formed of the composition, a laminate, and an image display device.

BRIEF DESCRIPTION OF THE DRAWINGS

FIG. 1 is a diagram showing a relationship between decomposition rates and highest occupied molecular orbital energy levels of dichroic substances.

DESCRIPTION OF THE PREFERRED EMBODIMENTS

Hereinafter, the invention will be described.

The following description of constituent requirements is based on typical embodiments of the invention, but the invention is not limited thereto.

In this specification, a numerical value range expressed using "to" means a range including numerical values before and after "to" as a lower limit value and an upper limit value.

In this specification, the term (meth)acrylic acid is a generic term for "acrylic acid" and "methacrylic acid", and the term (meth)acryloyl is a generic term for "acryloyl" and "methacryloyl".

In this specification, the dichroic substance means a compound having different absorbances depending on the direction.

[Composition]

A composition according to the embodiment of the invention is a composition containing a dichroic substance having an azo group. The dichroic substance exhibits a highest occupied molecular orbital energy level of −5.60 eV or less and a CLogP value of 7.0 or greater. In this specification, a dichroic substance having an azo group and exhibiting a HOMO energy level of −5.60 eV or less and a CLogP value of 7.0 or greater is also referred to as "specific dichroic substance".

According to the composition according to the embodiment of the invention, it is possible to form a light absorption anisotropic film having excellent light fastness. The detailed reason for this is not clear, but presumed as follows.

That is, it has been thought that the light fastness of the dichroic substance having an azo group decreases due to oxidative decomposition of the dichroic substance by light irradiation. However, in the examination by the inventors, it has been found that a decomposition product other than a decomposition product produced by oxidative decomposition is contained as a decomposition product of the dichroic substance having an azo group produced by light irradiation. Therefore, the decrease in the light fastness of the dichroic substance having an azo group is presumed to be affected by a mechanism other than oxidative decomposition.

The inventors have further examined such problems, and found that in a case where a dichroic substance having a low HOMO energy level is used among dichroic substances having an azo group, the light fastness of the light absorption anisotropic film is remarkably improved with a predetermined value as a boundary point, although the reason for this is not clear, and the invention has been achieved.

Hereinafter, components contained in the composition according to the embodiment of the invention and components which may be contained will be described.

[Specific Dichroic Substance]

A specific dichroic substance according to the embodiment has an azo group and exhibits a HOMO energy level of −5.60 eV or less and a CLogP value of 7.0 or greater.

The specific dichroic substance is not particularly limited as long as the HOMO energy level and the CLogP value thereof satisfy the above values, respectively. However, a dichroic substance represented by Formula (1) is preferable from the viewpoint of the fact that the effects of the invention are further exhibited.

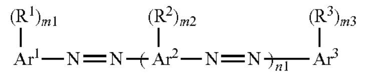

(1)

In Formula (1), m1, m2, and m3 each independently represent an integer of 0 to 5. m1 is preferably 2 or 3, m2 is preferably 0 or 1, and m3 is preferably 2 or 3.

In Formula (1), n1 represents an integer of 1 to 4. From the viewpoint of a further improvement in the light fastness, n1 is preferably 1 to 3, and more preferably 2 or 3.

In Formula (1), $Ar^1$ represents an aromatic hydrocarbon ring or heterocyclic ring having a valence of (m1+1) (for example, divalent in a case where m1 is 1), $Ar^2$ represents an aromatic hydrocarbon ring or heterocyclic ring having a valence of (m2+2) (for example, trivalent in a case where m2 is 1), and $Ar^3$ represents an aromatic hydrocarbon ring or heterocyclic ring having a valence of (m3+1) (for example, divalent in a case where m3 is 1). In a case of n1≥2, a plurality of $Ar^2$'s may be the same or different.

The aromatic hydrocarbon ring may be a monocyclic ring or may have a condensed ring structure of two or more rings. The number of aromatic hydrocarbon rings is preferably 1 to 4, more preferably 1 or 2, and even more preferably 1 (that is, a benzene ring) from the viewpoint of a further improvement in the light fastness and an improvement in the solubility with respect to an organic solvent.

Specific examples of the aromatic hydrocarbon ring include a benzene ring, an azulene ring, a naphthalene ring, a fluorene ring, an anthracene ring, and a tetracene ring. From the viewpoint of a further improvement in the light fastness and an improvement in the solubility with respect to an organic solvent, a benzene ring and a naphthalene ring are preferable, and a benzene ring is more preferable.

The heterocyclic ring may be either aromatic or non-aromatic. An aromatic heterocyclic ring is preferable from the viewpoint of an improvement in the dichroic ratio.

The aromatic heterocyclic ring may be a monocyclic ring or may have a condensed ring structure of two or more rings. Examples of the atom other than a carbon atom constituting the aromatic heterocyclic ring include a nitrogen atom, a sulfur atom, and an oxygen atom. In a case where the aromatic heterocyclic ring has a plurality of ring-constituent atoms other than a carbon atom, these may be the same or different.

Specific examples of the aromatic heterocyclic ring include a pyridine ring, a thiophene ring, a quinoline ring, an isoquinoline ring, a thiazole ring, a benzothiadiazole ring, a phthalimide ring, a thienothiazole ring, a thienothiophene ring, and a thienooxazole ring, and a thienothiazole ring is preferable from the viewpoint of a further improvement in the light fastness and an improvement in the dichroic ratio.

Preferably, $Ar^1$ to $Ar^3$ each independently represent a benzene ring or a thienothiazole ring, and more preferably, $Ar^1$ to $Ar^3$ arc all benzene rings from the viewpoint of an improvement in the solubility and the alignment degree.

In Formula (1), $R^1$, $R^2$, and $R^3$ each independently represent a substituent. In a case of $m1 \geq 2$, a plurality of $R^1$'s may be the same or different, in a case of $m2 \geq 2$, a plurality of $R^2$'s may be the same or different, and in a case of $m3 \geq 2$, a plurality of $R^3$'s may be the same or different. In a case of $n1 \geq 2$, a plurality of $—(R^2)_{m2}$'s may be the same or different.

The total number of substituents selected from the group consisting of $R^1$, $R^2$, and $R^3$ is 2 or more, preferably 3 or more, and more preferably 4 or more. The upper limit value thereof is not particularly limited, and is usually 8 or less.

Regarding the number of "substituents selected from the group consisting of $R^1$, $R^2$, and $R^3$", in a case where there is a plurality of $R^1$, $R^2$, or $R^3$ in Formula (1), the number of all these substituents is counted. For example, in a case of m1=2, m2=1, m3=2, and n=1 in Formula (1), a total of 5 substituents, that is, 2 $R^1$'s, 1 $R^2$, and 2 $R^3$'s are included.

The substituent is a monovalent substituent, and examples thereof include an alkyl group, an alkenyl group, an aralkyl group, an aryl group, a heterocyclic group, a halogen atom, a cyano group, a nitro group, a mercapto group, a hydroxy group, an alkoxy group, an aryloxy group, an alkylthio group, an arylthio group, an acyloxy group, an amino group, an alkylamino group, a carbonamide group, a sulfonamide group, a sulfamoylamino group, an oxycarbonylamino group, an oxysulfonylamino group, an ureido group, a thioureido group, an acyl group, an oxycarbonyl group, a carbamoyl group, a sulfonyl group, a sulfinyl group, a sulfamoyl group, a carboxy group (including salt), and a sulfo group (including salt). These groups may be further substituted by the above groups.

More specific examples of the substituent will be shown below.

The alkyl group is preferably a linear, branched, or cyclic alkyl group having 1 to 18 carbon atoms, and examples thereof include methyl, ethyl, propyl, isopropyl, t-butyl, cyclopentyl, cyclohexyl, 2-hydroxyethyl, 3-hydroxypropyl, 4-hydroxybutyl, 3-methoxypropyl, 2-aminoethyl, acetoamidemethyl, 2-acetoamidethyl, carboxymethyl, 2-carboxyethyl, 2-sulfoethyl, ureidomethyl, 2-ureidoethyl, carbamoylmethyl, 2-carbamoylethyl, 3-carbamoylpropyl, pentyl, hexyl, octyl, decyl, undecyl, dodecyl, hexadecyl, and octadecyl.

The alkenyl group is preferably a linear, branched, or cyclic alkenyl group having 2 to 18 carbon atoms, and examples thereof include vinyl, allyl, 1-propenyl, 2-pentenyl, 1,3-butadienyl, 2-octenyl, and 3-dodecenyl.

The aralkyl group preferably has 7 to 10 carbon atoms, and examples thereof include benzyl.

The aryl group preferably has 6 to 10 carbon atoms, and examples thereof include phenyl, naphthyl, p-dibutylaminophenyl, and p-methoxyphenyl.

The heterocyclic group is preferably a 5- or 6-membered saturated or unsaturated heterocyclic group including a carbon atom, a nitrogen atom, an oxygen atom, or a sulfur atom. The number of hetero atoms constituting a ring and the number of kinds of elements may be one or more, respectively. Examples of the heterocyclic group include furyl, benzofuryl, pyranyl, pyrrolyl, imidazolyl, isoxazolyl, pyrazolyl, benzotriazolyl, pyridyl, pyrimidyl, pyridazinyl, thienyl, indolyl, quinolyl, phthalazinyl, quinoxalinyl, pyrrolidinyl, pyrrolinyl, imidazolidinyl, imidazolinyl, pyrazolidinyl, piperidyl, piperadinyl, indolinyl, and morpholinyl.

Examples of the halogen atom include a fluorine atom, a chlorine atom, and a bromine atom.

The alkoxy group preferably has 1 to 18 carbon atoms, and examples thereof include methoxy, ethoxy, propoxy, isopropoxy, butoxy, 2-methoxyethoxy, 2-methane sulfonylethoxy, pentyloxy, hexyloxy, octyloxy, undecyloxy, dodecyloxy, hexadecyloxy, and octadecyloxy.

The aryloxy group preferably has 6 to 10 carbon atoms, and examples thereof include phenoxy and p-methoxyphenoxy.

The alkylthio group preferably has 1 to 18 carbon atoms, and examples thereof include methylthio, ethylthio, octylthio, undecylthio, dodecylthio, hexadecylthio, and octadecylthio.

The arylthio group preferably has 6 to 10 carbon atoms, and examples thereof include phenylthio and 4-methoxyphenylthio.

The acyloxy group preferably has 1 to 18 carbon atoms, and examples thereof include acetoxy, propanoyloxy, pentanoyloxy, octanoyloxy, dodecanoyloxy, and octadecanoyloxy.

The alkylamino group preferably has 1 to 18 carbon atoms, and examples thereof include methylamino, dimethylamino, diethylamino, dibutylamino, octylamino, dioctylamino, and undecylamino.

The carbonamide group preferably has 1 to 18 carbon atom, and examples thereof include acetamide, acetylmethylamino, acetyloctylamino, acetyldecylamino, acetylundecylamino, acetyloctadecylamino, propanoylamino, pentanoylamino, octanoylamino, octanoylmethylamino, dodecanoylamino, dodecanoylmethylamino, and octadecanoylamino.

The sulfonamide group preferably has 1 to 18 carbon atoms, and examples thereof include methanesulfonamide, ethanesulfonamide, propyl sulfonamide, 2-methoxyethylsulfonamidc, 3-aminopropylsulfonamide, 2-acetamideethylsulfonamide, octylsulfonamide, and undecylsulfonamide.

The oxycarbonylamino group preferably has 1 to 18 carbon atoms, and examples thereof include methoxycarbonylamino, ethoxycarbonylamino, octyloxycarbonylamino, and undecyloxycarbonylamino.

The oxysulfonylamino group preferably has 1 to 18 carbon atoms, and examples thereof include methoxysulfonylamino, ethoxysulfonylamino, octyloxysulfonylamino, and undecyloxysulfonylamino.

The sulfamoylamino group preferably has 0 to 18 carbon atoms, and examples thereof include methylsulfamoylamino, dimethylsulfamoylamino, ethylsulfamoylamino, propylsulfamoylamino, octylsulfamoylamino, and undecylsulfamoylamino.

The ureido group preferably has 1 to 18 carbon atoms, and examples thereof include ureido, methylureido, N,N-dimethylureido, octylureido, and undecylureido.

The thioureido group preferably has 1 to 18 carbon atoms, and examples thereof include thioureido, methylthioureido, N,N-dimethylthioureido, octylthioureido, and undecylthioureido.

The acyl group preferably has 1 to 18 carbon atoms, and examples thereof include acetyl, benzoyl, octanoyl, decanoyl, undecanoyl, and octadecanoyl.

The oxycarbonyl group preferably has 1 to 18 carbon atoms, and examples thereof include alkoxycarbonyl groups such as methoxycarbonyl, ethoxycarbonyl, octyloxycarbonyl, and undecyloxycarbonyl.

The carbamoyl group preferably has 1 to 18 carbon atoms, and examples thereof include carbamoyl, N,N-dimethylcarbamoyl, N-ethylcarbamoyl, N-octylcarbamoyl, N,N-dioctylcarbamoyl, and N-undecylcarbamoyl.

The sulfonyl group preferably has 1 to 18 carbon atoms, and examples thereof include methanesulfonyl, ethanesulfonyl, 2-chloroethanesulfonyl, octanesulfonyl, and undecanesulfonyl.

The sulfinyl group preferably has 1 to 18 carbon atoms, and examples thereof include methanesulfinyl, ethanesulfinyl, and octanesulfinyl.

The sulfamoyl group preferably has 0 to 18 carbon atoms, and examples thereof include sulfamoyl, dimethylsulfamoyl, ethylsulfamoyl, octylsulfamoyl, dioctylsulfamoyl, and undecylsulfamoyl.

Preferably, one or more of the substituents selected from the group consisting of $R^1$, $R^2$, and $R^3$ in Formula (1) are electron-withdrawing groups, and more preferably two or more are electron-withdrawing groups. Accordingly, the HOMO energy level is easily adjusted within a desired range. The upper limit of the number of electron-withdrawing groups is not particularly limited, and is usually six.

From the viewpoint of synthesis, at least one of $R^1$ or $R^3$ is an electron-withdrawing group.

Here, the electron-withdrawing group (electron-attracting group) means a substituent having a positive Hammett substituent constant σp value, and specific examples thereof include a halogen atom, a trifluoromethyl group, a cyano group, a nitro group, an alkoxycarbonyl group (for example, an ethoxycarbonyl group), and a carboxy group.

Among the electron-withdrawing groups, substituents having a Hammett substituent constant σp value of 0.2 or greater (for example, halogen atoms and cyano groups) are preferable from the viewpoint of facilitating the adjustment of the HOMO energy level within a desired range.

Here, the Hammett substituent constant σ is a numerical value representing the effect of the substituent on an acid dissociation equilibrium constant of a substituted benzoic acid, and is a parameter indicating the strength of the electron-withdrawing property and the electron-donating property of the substituent. In this specification, the Hammett substituent constant σp value means a substituent constant σ in a case where the substituent is positioned at the para-position of the benzoic acid.

In this specification, values described in the literature "Hansch et al., Chemical Reviews, 1991, Vol, 91, No. 2, 165 to 195" are employed as Hammett substituent constant σp values of the respective groups. Regarding groups of which the Hammett substituent constant σp values arc not shown in the above literature, the Hammett substituent constant σp values thereof can be calculated based on a difference between pKa of the benzoic acid and pKa of the benzoic acid derivative having a substituent at the para-position using software "ACD/ChemSketch (ACD/Labs 8.00 Release Product Version: 8.08)".

As the specific dichroic substance, a compound represented by Formula (2) is preferable from the viewpoint of a further improvement in the light fastness.

(2)

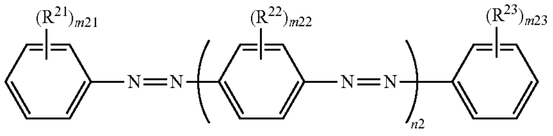

In Formula (2), m21 and m23 each independently represent an integer of 0 to 5. m21 and m23 are respectively synonymous with m1 and m3 in Formula (1).

In Formula (2), m22 represents an integer of 0 to 4. A preferable aspect of m22 is the same as that of m2 in Formula (1).

In Formula (2), n2 represents an integer of 2 or 3.

In Formula (2), $R^{21}$, $R^2$, and $R^{23}$ each independently represent a substituent. A plurality of $-(R^{22})_{m22}$'s may be the same or different. In a case of m21≥2, a plurality of $R^{21}$'s may be the same or different, in a case of m22≥2, a plurality of $R^{22}$'s may be the same or different, and in a case of m23≥2, a plurality of $R^{23}$'s may be the same or different. $R^{21}$, $R^{22}$, and $R^{23}$ are respectively synonymous with $R^1$, $R^2$, and $R^3$ in Formula (1).

The total number of substituents selected from the group consisting of $R^{21}$, $R^{22}$, and $R^{23}$ is 2 or more, and two or more substituents are electron-withdrawing groups. The meaning of the "substituents selected from the group consisting of $R^{21}$, $R^{22}$, and $R^{23}$" is the same as that of the "substituents selected from the group consisting of $R^1$, $R^2$, and $R^3$".

Specific examples of the specific dichroic substance will be shown below. In the following specific examples, "Me" represents a methyl group, "Et" represents an ethyl group, and "Bu" represents a butyl group.

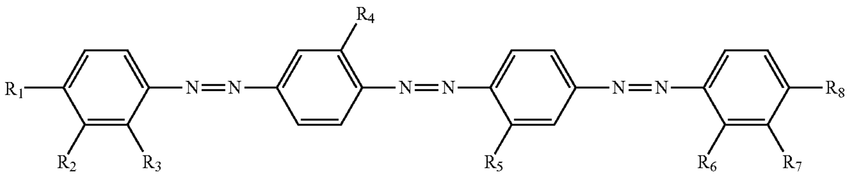

| No | $R_1$ | $R_2$ | $R_3$ | $R_4$ | $R_5$ | $R_6$ | $R_7$ | $R_8$ | HOMO (eV) | CLogP |
|---|---|---|---|---|---|---|---|---|---|---|
| I-1 | $OC_5H_{11}$ | Cl | H | H | H | H | Cl | $OC_5H_{11}$ | −5.64 | 13.5 |
| I-2 | $OC_5H_{11}$ | H | Cl | H | Me | Cl | H | $OC_5H_{11}$ | −5.61 | 14.0 |
| I-3 | $C_{11}H_{23}$ | Cl | Cl | H | Me | Cl | Cl | $C_{11}H_{23}$ | −5.68 | 22.1 |
| I-4 | $OC(O)C_5H_{11}$ | Cl | H | Cl | H | H | Cl | $OC_5H_{11}$ | −5.71 | 13.7 |
| I-5 | Cl | H | H | Me | H | H | H | Cl | −5.64 | 9.8 |
| I-6 | CN | H | H | H | Me | H | Cl | $N(C_2H_5)_2$ | −5.62 | 10.1 |
| I-7 | CN | CN | H | H | H | H | H | $OC_5H_{11}$ | −5.83 | 9.1 |
| I-8 | $NO_2$ | H | H | Cl | H | Cl | H | $C_5H_{11}$ | −5.90 | 11.7 |
| I-9 | $C_{11}H_{23}$ | $CF_3$ | H | H | Cl | H | $CF_3$ | $C_{11}H_{23}$ | −5.65 | 22.0 |
| I-10 | $O(CH_2)_4OC(O)CH{=}CH_2$ | Cl | H | H | Me | H | Cl | $O(CH_2)_4OC(O)CH{=}CH_2$ | −5.61 | 12.1 |
| I-11 | $O(CH_2)_2OC(O)CH{=}CH_2$ | Cl | H | H | Me | H | Cl | $O(CH_2)_2OC(O)CH{=}CH_2$ | −5.61 | 10.8 |
| I-12 | $O(CH_2)_4OC(O)CH{=}CH_2$ | H | Cl | H | Me | Cl | H | $O(CH_2)_4OC(O)CH{=}CH_2$ | −5.63 | 12.6 |
| I-13 | $O(CH_2)_4OC(O)CH{=}CH_2$ | Cl | Cl | H | Me | Cl | Cl | $O(CH_2)_4OC(O)CH{=}CH_2$ | −5.68 | 13.3 |
| I-14 | $O(CH_2)_6OC(O)CH{=}CH_2$ | H | CN | H | H | CN | H | $O(CH_2)_6OC(O)CH{=}CH_2$ | −5.89 | 11.8 |
| I-15 | $O(CH_2)_4OC(O)CH{=}CH_2$ | CN | H | H | Me | CN | H | $OC_5H_{11}$ | −5.88 | 11.1 |
| I-16 | $O(CH_2)_4OC(O)CH{=}CH_2$ | F | F | H | Me | F | F | $O(CH_2)_4OC(O)CH{=}CH_2$ | −5.64 | 11.2 |
| I-17 | $O(CH_2)_4OC(O)CH{=}CH_2$ | H | $NO_2$ | H | $CF_3$ | $NO_2$ | H | $O(CH_2)_4OC(O)CH{=}CH_2$ | −5.87 | 11.2 |
| I-18 | $O(CH_2)_4OC(O)CH{=}CH_2$ | H | OH | H | Me | H | Cl | $O(CH_2)_4OC(O)CH{=}CH_2$ | −5.60 | 11.4 |
| I-19 | $O(CH_2)_4OC(O)CH{=}CH_2$ | H | OH | H | Me | Cl | H | $O(CH_2)_4OC(O)CH{=}CH_2$ | −5.62 | 11.7 |

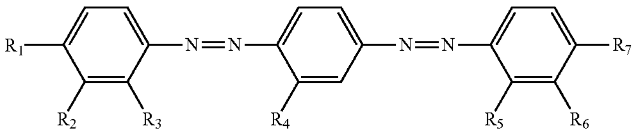

| No | $R_1$ | $R_2$ | $R_3$ | $R_4$ | $R_5$ | $R_6$ | $R_7$ | HOMO (eV) | CLogP |
|---|---|---|---|---|---|---|---|---|---|
| II-1 | $OC_5H_{11}$ | Cl | H | H | H | Cl | $OC_5H_{11}$ | −5.62 | 11.6 |
| II-2 | $OC_5H_{11}$ | H | Cl | Me | Cl | H | $OC_5H_{11}$ | −5.60 | 12.5 |
| II-3 | $C_{11}H_{23}$ | Cl | Cl | H | Cl | Cl | $C_{11}H_{23}$ | −5.65 | 13.9 |
| II-4 | $OC(O)C_5H_{11}$ | Cl | H | H | H | Cl | $OC_5H_{11}$ | −5.69 | 7.1 |
| II-5 | $O(CH_2)_4OC(O)CH{=}CH_2$ | Cl | H | H | H | Cl | $O(CH_2)_4OC(O)CH{=}CH_2$ | −5.63 | 9.8 |
| II-6 | $O(CH_2)_6OC(O)CH{=}CH_2$ | Cl | H | Me | Cl | H | $O(CH_2)_6OC(O)CH{=}CH_2$ | −5.63 | 11.0 |
| II-7 | $O(CH_2)_4OC(O)CH{=}CH_2$ | Cl | Cl | H | Cl | Cl | $O(CH_2)_4OC(O)CH{=}CH_2$ | −5.72 | 10.9 |
| II-8 | $O(CH_2)_4OC(O)CH{=}CH_2$ | CN | H | H | H | CN | $O(CH_2)_4OC(O)CH{=}CH_2$ | −5.75 | 7.7 |

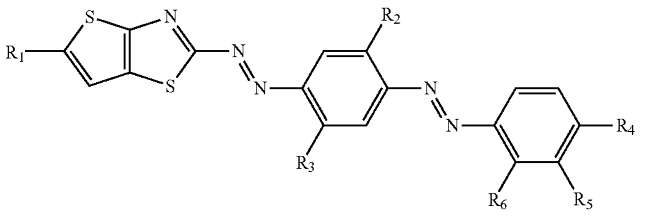

| No | $R_1$ | $R_2$ | $R_3$ | $R_4$ | $R_5$ | $R_6$ | HOMO (eV) | CLogP |
|---|---|---|---|---|---|---|---|---|
| III-1 | $CO_2Et$ | H | H | OBu | Cl | H | −5.66 | 8.7 |
| III-2 | CN | H | Cl | $O(CH_2)_2OC(O)CH{=}CH_2$ | H | H | −5.78 | 7.3 |
| III-3 | $COO(CH_2)_{11}OC(O)CH_3$ | Cl | Cl | $O(CH_2)_4OC(O)CH{=}CH_2$ | H | Cl | −5.70 | 13.0 |
| III-4 | $C(O)OC_{11}H_{23}$ | CN | H | $O(CH_2)_4OC(O)CH{=}CH_2$ | H | H | −5.80 | 12.1 |
| III-5 | $C(O)O(CH_2)_{11}OC(O)CH{=}CH_2$ | $NO_2$ | H | $O(CH_2)_2OC(O)CH{=}CH_2$ | Cl | H | −5.82 | 11.8 |
| III-6 | $C(O)O(CH_2)_{11}OC(O)CH{=}CH_2$ | H | Cl | $O(CH_2)_2OC(O)CH{=}CH_2$ | Cl | H | −5.74 | 12.7 |

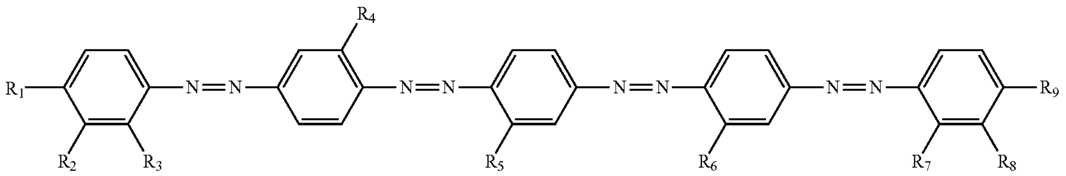

| No | $R_1$ | $R_2$ | $R_3$ | $R_4$ | $R_5$ | $R_6$ | $R_7$ | $R_8$ | $R_9$ | HOMO (eV) | CLogP |
|---|---|---|---|---|---|---|---|---|---|---|---|
| IV-1 | $C(O)OC_2H_5$ | Cl | H | H | H | Me | H | Cl | $O(CH_2)_4OC(O)CH{=}CH_2$ | −5.64 | 13.0 |
| IV-2 | CN | H | Cl | H | H | H | H | H | $O(CH_2)_4OC(O)CH{=}CH_2$ | −5.75 | 10.5 |
| IV-3 | $O(CH_2)_{11}OC(O)CH_3$ | Cl | Cl | H | H | Cl | H | H | $O(CH_2)_{11}OC(O)CH_3$ | −5.63 | 19.5 |
| IV-4 | $CO_2C_{11}H_{23}$ | CN | H | Me | H | H | H | CN | $C(O)OC_{11}H_{23}$ | −5.73 | 19.8 |
| IV-5 | $O(CH_2)_4OC(O)CH{=}CH_2$ | H | Cl | H | Me | Me | Cl | H | $O(CH_2)_4OC(O)CH{=}CH_2$ | −5.64 | 14.3 |
| IV-6 | $O(CH_2)_4OC(O)CH{=}CH_2$ | Cl | H | H | Me | Me | H | Cl | $O(CH_2)_4OC(O)CH{=}CH_2$ | −5.62 | 14.0 |
| IV-7 | $O(CH_2)_4OC(O)CH{=}CH_2$ | H | H | Cl | Cl | H | H | H | $O(CH_2)_4OC(O)CH{=}CH_2$ | −5.65 | 13.2 |
| IV-8 | $O(CH_2)_4OC(O)CH{=}CH_2$ | H | H | H | Cl | Cl | H | H | $O(CH_2)_4OC(O)CH{=}CH_2$ | −5.66 | 13.3 |
| IV-9 | $O(CH_2)_4OC(O)CH{=}CH_2$ | Cl | H | H | Cl | Cl | H | H | $O(CH_2)_4OC(O)CH{=}CH_2$ | −5.69 | 14.1 |
| IV-10 | $O(CH_2)_4OC(O)CH{=}CH_2$ | F | H | H | H | H | H | F | $O(CH_2)_4OC(O)CH{=}CH_2$ | −5.60 | 12.0 |
| IV-11 | $O(CH_2)_4OC(O)CH{=}CH_2$ | F | F | H | H | Me | F | F | $O(CH_2)_4OC(O)CH{=}CH_2$ | −5.63 | 12.7 |

The HOMO energy level of the specific dichroic substance is −5.60 eV or less, and from the viewpoint of a further improvement in the light fastness, it is more preferably −5.62 eV or less, and even more preferably −5.64 eV or less. The lower limit value of the HOMO energy level of the specific dichroic substance is not particularly limited, and is usually −5.90 eV.

Here, in the invention, a value calculated by Gaussian 97 (software manufactured by GAUSSIAN INC., USA) with a compound subjected to structural optimization through a semi-empirical molecular orbital calculation method PM3 is used as the HOMO energy level.

The CLogP value of the specific dichroic substance is 7.0 or greater, and from the viewpoint of high solubility with respect to an organic solvent, it is more preferably 8.0 or greater, and even more preferably 9.0 or greater. The upper limit value of the CLogP value of the specific dichroic substance is not particularly limited, and is usually 20.0.

Here, the CLogP value is an index indicating the hydrophilic property and the hydrophobic property of a chemical structure, and the larger the value, the more hydrophobic the chemical structure. In the invention, a value calculated by inputting a structural formula of a compound into ChemBioDraw Ultra 13.0 is employed as the CLogP value.

The maximum absorption wavelength of the specific dichroic substance is preferably within a range of 400 to 500 nm.

The specific dichroic substance may or may not exhibit liquid crystallinity.

In a case where the specific dichroic substance exhibits liquid crystallinity, it may be either nematic or smectic. The temperature range in which the liquid crystal phase is exhibited is preferably room temperature (about 20° C. to 28° C.) to 300° C., and more preferably 50° C. to 200° C. from the viewpoint of handleability and manufacturing suitability.

The composition according to the embodiment of the invention may contain one kind of specific dichroic substance alone, or two or more kinds of specific dichroic substances.

[Liquid Crystalline Compound]

The composition according to the embodiment of the invention preferably contains a liquid crystalline compound. In a case where a liquid crystalline compound is contained, it is possible to highly align the specific dichroic substance while suppressing the precipitation of the specific dichroic substance.

The liquid crystalline compound does not exhibit dichroism.

Any of a low-molecular-weight liquid crystalline compound and a high-molecular-weight liquid crystalline compound can be used as the liquid crystalline compound. Here, the "low-molecular-weight liquid crystalline compound" refers to a liquid crystalline compound having no repeating unit in the chemical structure. In addition, the "high-molecular-weight liquid crystalline compound" refers to a liquid crystalline compound having a repeating unit in the chemical structure.

Examples of the low-molecular-weight liquid crystalline compound include liquid crystal compounds described in JP2013-228706A.

Examples of the high-molecular-weight liquid crystalline compound include thermotropic liquid crystalline polymers described in JP2011-237513A. The high-molecular-weight liquid crystalline compound may have a crosslinking group (for example, an acryloyl group and a methacryloyl group) at a terminal.

The liquid crystalline compounds may be used alone or in combination of two or more kinds thereof.

In a case where the liquid crystalline compound is contained, the content of the liquid crystalline compound is preferably 25 to 2,000 parts by mass, more preferably 33 to 1,000 parts by mass, and even more preferably 50 to 500 parts by mass with respect to 100 parts by mass of the specific dichroic substance in the composition. In a case where the content of the liquid crystalline compound is within the above range, the alignment degree of a light absorption anisotropic film is further improved.

<Other Dichroic Substances>

The composition according to the embodiment of the invention may further contain one or more dichroic substances (hereinafter, also referred to as "other dichroic substances") other than the specific dichroic substance.

Examples of such other dichroic substances include dichroic dyes described in paragraphs [0067] to [0071] of JP2013-228706A, paragraphs [0008] to [0026] of JP2013-227532A, paragraphs [0008] to [0015] of JP2013-209367A, paragraphs [0045] to [0060] of JP2013-148883A, paragraphs [0012] to [0029] of JP2013-109090A, paragraphs

[0009] to [0017] of JP2013-101328A, paragraphs [0051] to [0065] of JP2013-037353A, paragraphs [0049] to [0073] of JP2012-063387A, paragraphs [0016] to [0018] of JPI999-305036A (JP-H1-305036A), paragraphs [0009] to [0011] of JP2001-133630A, and paragraphs [0030] to [0169] of JP2011-215337A, and dichroic dye polymers having thermotropic liquid crystallinity described in paragraphs [0035] to [0062] of JP2016-004055A.

In a case where the composition according to the embodiment of the invention contains other dichroic substances, the content of other dichroic substances is preferably 20 to 500 parts by mass, and more preferably 30 to 300 parts by mass with respect to 100 parts by mass of the specific dichroic substance in the composition.

[Polymerization Initiator]

The composition according to the embodiment of the invention preferably contains a polymerization initiator.

The polymerization initiator is not particularly limited, and a photosensitive compound, that is, a photopolymerization initiator is preferable.

As the photopolymerization initiator, various kinds of compounds can be used with no particular limitation. Specific examples of the photopolymerization initiator include α-carbonyl compounds (the specifications of US2367661A and US2367670A), acyloin ethers (the specification of US2448828A), aromatic acyloin compounds substituted by α-hydrocarbon (the specification of US2722512A), polynuclear quinone compounds (the specifications of US3046127A and US2951758A), combinations of triarylimidazole dimers and p-aminophenyl ketones (the specification of US3549367A), acridine and phenazine compounds (the specifications of JP1985-105667A (JP-S60-105667A) and US4239850A), oxadiazole compounds (the specification of US4212970A), and acylphosphine oxide compounds (JP1988-040799B (JP-S63-040799B), JP1993-029234B (JP-H5-029234B), JP1998-095788A (JP-H10-095788A), and JP1998-029997A (JP-H10-029997A)).

A commercially available product can also be used as the photopolymerization initiator, and examples thereof include IRGACURE 184, 907, 369, 651, 819, OXE-01, and OXE-02 manufactured by BASF SE.

In a case where the composition according to the embodiment of the invention contains a polymerization initiator, the content of the polymerization initiator is preferably 0.01 to 30 parts by mass, and more preferably 0.1 to 15 parts by mass with respect to a total of 100 parts by mass of the specific dichroic substance, other dichroic substances, and the liquid crystalline compound in the composition. In a case where the content of the polymerization initiator is 0.01 parts by mass or greater, the durability of a light absorption anisotropic film is improved, and in a case where the content of the polymerization initiator is 30 parts by mass or less, the alignment of a light absorption anisotropic film is improved.

[Solvent]

The composition according to the embodiment of the invention preferably contains a solvent from the viewpoint of workability and the like.

Examples of the solvent include organic solvents such as ketones (for example, acetone, 2-butanone, methyl isobutyl ketone, cyclopentanone, and cyclohexanone), ethers (for example, dioxane, tetrahydrofuran, 2-methyltetrahydrofuran, cyclopentyl methyl ether, and tetrahydropyran), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane, dichloroethane, dichlorobenzene, and chlorotoluene), esters (for example, methyl acetate, ethyl acetate, butyl acetate, and ethyl lactate), alcohols (for example, ethanol, isopropanol, butanol, cyclohexanol, isopentyl alcohol, neopentyl alcohol, diacetone alcohol, and benzyl alcohol), cellosolves (for example, methyl cellosolve, ethyl cellosolve, and 1,2-dimethoxyethane), cellosolve acetates, sulfoxides (for example, dimethyl sulfoxide), amides (for example, dimethylformamide and dimethylacetamide), and heterocyclic compounds (for example, pyridine), and water. These solvents may be used alone or in combination of two or more kinds thereof.

Among these solvents, ketones (particularly, cyclopentanone or cyclohexanone) and ethers (particularly, tetrahydrofuran, cyclopentyl methyl ether, or tetrahydropyran) are preferable from the viewpoint of utilizing the effect that the solubility is excellent according to the invention.

In a case where the composition according to the embodiment of the invention contains a solvent, the content of the solvent is preferably 80 to 99 mass %, more preferably 83 to 98 mass %, and even more preferably 85 to 96 mass % with respect to the total mass of the composition.

[Interface Improver]

The composition according to the embodiment of the invention preferably contains an interface improver. Due to the interface improver contained, the smoothness of the coating surface is improved, and the alignment degree is improved or cissing and unevenness are suppressed. Thus, an improvement in the in-plane uniformity is anticipated.

As the interface improver, a material making the liquid crystalline compound horizontal on the coating surface side is preferable, and the compounds (horizontal alignment agents) described in paragraphs [0253] to [0293] of JP2011-237513A can be used. The fluorine (meth)acrylate-based polymers described in paragraphs [0018] to [0043] of JP2007-272185A and the like can also be used. Other compounds may also be used as the interface improver.

In a case where the composition according to the embodiment of the invention contains an interface improver, the content of the interface improver is preferably 0.001 to 5 parts by mass, and more preferably 0.01 to 3 parts by mass with respect to a total of 100 parts by mass of the specific dichroic substance, other dichroic substances, and the liquid crystalline compound in the composition.

[Oxidant]

The composition according to the embodiment of the invention may contain an oxidant. The light fastness is further improved in a case where the oxidant is contained. One light fastness improving mechanism by the oxidant is presumed to be that in an excited state in which the azo dye is photoexcited, the oxidant rapidly receives excited electrons, and thus the excited state is deactivated.

The oxidant is not particularly limited, and examples thereof include an oxidant having at least one of a quinone structure or an N-oxyl structure.

In a case where an oxidant is contained, the content of the oxidant is preferably 0.1 to 100 parts by mass, more preferably 1 to 50 parts by mass, and even more preferably 1 to 40 parts by mass with respect to 100 parts by mass of the specific dichroic substance. In a case where the content of the oxidant is within the above range, the light fastness is further improved.

The oxidants may be used alone or in combination of two or more kinds thereof.

[Light Absorption Anisotropic Film]

A light absorption anisotropic film according to the embodiment of the invention is formed using the composition according to the embodiment of the invention described above.

Examples of the method of manufacturing the light absorption anisotropic film according to the embodiment of the invention include a method including, in order, a step of forming a coating film by applying the composition to a base (hereinafter, also referred to as "coating film forming step") and a step of aligning a dichroic substance contained in the coating film (hereinafter, also referred to as "alignment step").

Hereinafter, the respective steps of the method of manufacturing the light absorption anisotropic film according to the embodiment of the invention will be described.

[Coating Film Forming Step]

The coating film forming step is a step of forming a coating film by applying the composition to a base.

By using a composition containing the above-described solvent, or a liquid material such as a molten liquid obtained by heating the composition, the composition is easily applied to the base.

Examples of the method of applying the composition include known methods such as a roll coating method, a gravure printing method, a spin coating method, a wire bar coating method, an extrusion coating method, a direct gravure coating method, a reverse gravure coating method, a die-coating method, a spray method, and an ink jet method.

In this aspect, an example has been given in which the composition is applied to the base, but the invention is not limited thereto. For example, the composition may be applied to an alignment film provided on the base. Details of the base and the alignment film will be described later.

[Alignment Step]

The alignment step is a step of aligning a dichroic substance contained in the coating film. Thus, a light absorption anisotropic film is obtained.

The alignment step may have a drying treatment. Through the drying treatment, a component such as a solvent can be removed from the coating film. The drying treatment may be performed by a method of leaving the coating film for a predetermined time at room temperature (for example, natural drying), or a heating and/or air blowing method.

Here, the dichroic substance contained in the composition may be aligned by the above-described coating film forming step or drying treatment. For example, in an aspect in which the composition is prepared as a coating liquid containing a solvent, the coating film is dried to remove the solvent from the coating film, and thus a coating film having light absorption anisotropy (that is, light absorption anisotropic film) is obtained.

The alignment step preferably has a heating treatment. Accordingly, the dichroic substance contained in the coating film can be aligned, and thus the coating film after the heating treatment can be preferably used as a light absorption anisotropic film.

The heating treatment is preferably performed at 10° C. to 250° C., and more preferably at 25° C. to 190° C. in view of manufacturing suitability or the like. The heating time is preferably 1 to 300 seconds, and more preferably 1 to 60 seconds.

The alignment step may have a cooling treatment to be performed after the heating treatment. The cooling treatment is a treatment for cooling the coating film after the heating to about room temperature (20° C. to 25° C.). Accordingly, the alignment of the dichroic substance contained in the coating film can be fixed. The cooling means is not particularly limited, and the cooling can be performed by a known method.

By the above steps, a light absorption anisotropic film can be obtained.

In this aspect, examples of the method of aligning the dichroic substance contained in the coating film include the drying treatment and the heating treatment, but are not limited thereto, and a known alignment treatment can be used.

[Other Steps]

The method of manufacturing a light absorption anisotropic film may have a step of curing the light absorption anisotropic film (hereinafter, also referred to as "curing step") after the alignment step.

For example, the curing step is performed by heating and/or light irradiation (exposure). Among these, light irradiation is preferably performed to conduct the curing step.

As the light source used for curing, various light sources can be used such as infrared rays, visible light, and ultraviolet rays, and ultraviolet rays are preferable. In the curing, ultraviolet rays may be applied during heating, or may be applied via a filter which transmits only a component with a specific wavelength.

In addition, the exposure may be performed under a nitrogen atmosphere. In a case where the light absorption anisotropic film is cured by radical polymerization, inhibition of the polymerization by oxygen is reduced, and thus the exposure is preferably performed under a nitrogen atmosphere.

The film thickness of the light absorption anisotropic film is preferably 0.1 to 5.0 μm, and more preferably 0.3 to 1.5 μm. Although depending on the concentration of the dichroic substance in the composition, a light absorption anisotropic film having an excellent absorbance is obtained in a case where the film thickness is 0.1 μm or greater, and a light absorption anisotropic film having an excellent transmittance is obtained in a case where the film thickness is 5.0 μm or less.

[Laminate]

A laminate according to the embodiment of the invention has a base and the light absorption anisotropic film according to the embodiment of the invention formed on the base.

The laminate according to the embodiment of the invention may further have a λ/4 plate formed on the light absorption anisotropic film.

In addition, the laminate according to the embodiment of the invention may have an alignment film between the base and the light absorption anisotropic film.

The laminate according to the embodiment of the invention may further have a barrier layer between the light absorption anisotropic film and the λ/4 plate.

Hereinafter, the constituent layers of the laminate according to the embodiment of the invention will be described.

[Base]

The base can be selected in accordance with usage of the light absorption anisotropic film, and examples thereof include glass and a polymer film. The light transmittance of the base is preferably 80% or greater.

In a case where a polymer film is used as the base, an optically isotropic polymer film is preferably used. As specific examples and preferable aspects of the polymer, those described in a paragraph [0013] of JP2002-022942A can be applied. In addition, even a conventionally known polymer such as polycarbonate or polysulfone in which birefringence is likely to be developed can also be used by reducing the developability through molecular modification described in WO00/026705A.

[Light Absorption Anisotropic Film]

The light absorption anisotropic film is as described above. The dichroic substance contained in the light absorption anisotropic film may be aligned perpendicularly to the plane of the base (that is, aligned in a thickness direction of the light absorption anisotropic film), or aligned parallel to the plane of the base (that is, aligned in an in-plane direction of the light absorption anisotropic film).

[λ/4 Plate]

The "λ/4 plate" is a plate having a λ/4 function, and is specifically, a plate having a function of converting linearly polarized light with a specific wavelength into circularly polarized light (or converting circularly polarized light into linearly polarized light).

For example, in an aspect in which the λ/4 plate has a single layer structure, specific examples of the plate include a retardation film in which an optically anisotropic layer having a λ4 function is provided on a stretched polymer film or a support. In an aspect in which the λ/4 plate has a multilayered structure, specific examples of the plate include a broadband λ/4 plate having a laminate of a λ/4 plate and a λ/2 plate.

The λ/4 plate and the light absorption anisotropic film may be provided in contact with each other, or another layer may be provided between the λ/4 plate and the light absorption anisotropic film. Examples of the layer include a pressure sensitive adhesive layer or an adhesive layer for securing adhesiveness and a barrier layer.

[Barrier Layer]

In a case where the laminate according to the embodiment of the invention has a barrier layer, the barrier layer is provided between the light absorption anisotropic film and the λ/4 plate. In a case where a layer other than the barrier layer (for example, a pressure sensitive adhesive layer or an adhesive layer) is provided between the light absorption anisotropic film and the λ/4 plate, the barrier layer can be provided between, for example, the light absorption anisotropic film and the above layer other than the barrier layer.

The barrier layer is also called a gas barrier layer (oxygen barrier layer), and has a function of protecting the light absorption anisotropic film from a gas such as oxygen in the atmosphere, moisture, or a compound contained in the adjacent layer.

Regarding the barrier layer, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A can be referred to.

[Alignment Film]

The laminate according to the embodiment of the invention may have an alignment film between the base and the light absorption anisotropic film.

As the alignment film, any layer may be used as long as it allows the dichroic substance contained in the composition according to the embodiment of the invention to have a desired alignment state on the alignment film.

The alignment film can be provided by means of a rubbing treatment on the film surface with an organic compound (preferably a polymer), oblique vapor deposition of an inorganic compound, forming a layer having microgrooves, or accumulation of an organic compound (for example, ω-tricosanoic acid, dioctadecylmethylammonium chloride or methyl stearate) by the Langmure-Blogette method (LB film). Furthermore, there have been known alignment films having an aligning function imparted thereto by applying an electrical field, applying a magnetic field, or light irradiation. In the invention, among these, an alignment film formed by a rubbing treatment is preferable in view of easy control of a pretilt angle of the alignment film, and a photo-alignment film formed by light irradiation is also preferable in view of alignment uniformity.

<Rubbed Alignment Film>

The polymer material used for an alignment film formed by a rubbing treatment is described in many literatures, and many commercially available products are available. In the invention, polyvinyl alcohol or polyimide, or derivatives thereof can be preferably used. Regarding the alignment film, the description in the 24th line on page 43 to 8th line on page 49 in WO2001/088574A1 can be referred to. The thickness of the alignment film is preferably 0.01 to 10 μm, and more preferably 0.01 to 1 μm.

<Photo-Alignment Film>

The photo-alignment material used for an alignment film formed by light irradiation is described in many literatures. In the invention, preferable examples thereof include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photo-alignment units described in JP2002-265541A and JP2002-317013A, photocrosslinkable silane derivatives described in JP4205195B and JP4205198B, and photocrosslinkable polyimides, polyamides, and esters described in JP2003-520878A, JP2004-529220A, and JP4162850B. Azo compounds, photocrosslinkable polyimides, polyamides, and esters are more preferable.

To a photo-alignment film formed from the above-described material, linearly polarized light or unpolarized light is applied to manufacture a photo-alignment film.

In this specification, the "linearly polarized light irradiation" and the "unpolarized light irradiation" are operations for causing a photoreaction to the photo-alignment material. The wavelength of the light used varies depending on the photo-alignment material used and is not particularly limited as long as the wavelength is a wavelength necessary for the photoreaction. The peak wavelength of the light used for light irradiation is preferably 200 nm to 700 nm, and ultraviolet light having a light peak wavelength of 400 nm or less is more preferable.

The light source used for light irradiation is a usually used light source, and examples thereof include lamps such as a tungsten lamp, a halogen lamp, a xenon lamp, a xenon flash lamp, a mercury lamp, a mercury/xenon lamp, and a carbon arc lamp, various lasers [for example, a semiconductor laser, a helium/neon laser, an argon ion laser, a helium/cadmium laser, and an YAG (yttrium/aluminum/garnet) laser], light emitting diodes, and cathode ray tubes.

As means for obtaining linearly polarized light, a method using a polarizing plate (for example, an iodine polarizing plate, a dichroic dye polarizing plate, or a wire grid polarizing plate), a method using a prism-based element (for example, a GLAN-THOMSON prism) or a reflective polarizer using a BREWSTER angle, or a method using light emitted from a polarized laser light source can be employed. Only light having a necessary wavelength may be selectively applied by using a filter, a wavelength conversion element, or the like.

In a case where linearly polarized light is used as light for irradiation, a method of irradiating the alignment film with light from an upper surface or a rear surface in a direction vertical or oblique to the alignment film surface is employed. Although the incidence angle of the light varies depending on the photo-alignment material, the incidence angle is preferably 0° to 90° (vertical), and more preferably 40° to 90°.

In a case where unpolarized light is used, the alignment film is irradiated with unpolarized light from an oblique direction. The incidence angle of the light is preferably 10° to 80°, more preferably 20° to 60°, and even more preferably 30° to 50°.

The irradiation time is preferably 1 minute to 60 minutes, and more preferably 1 minute to 10 minutes.

In a case where patterning is required, a method of performing light irradiation using a photomask as many times as necessary for pattern formation, or a pattern writing method using laser beam scanning can be employed.

[Usage]

The laminate according to the embodiment of the invention can be used as a polarizing element (polarizing plate). For example, it can be used as a linearly polarizing plate or a circularly polarizing plate.

In a case where the laminate according to the embodiment of the invention has no optically anisotropic layer such as the λ4 plate, the laminate can be used as a linearly polarizing plate.

In a case where the laminate according to the embodiment of the invention has the λ/4 plate, the laminate can be used as a circularly polarizing plate.

[Image Display Device]

An image display device according to the embodiment of the invention has the above-described light absorption anisotropic film or the above-described laminate.

The display element used for the image display device according to the embodiment of the invention is not particularly limited, and examples thereof include a liquid crystal cell, an organic electroluminescence (hereinafter, abbreviated as "EL"), a display panel, and a plasma display panel.

Among these, a liquid crystal cell or an organic EL display panel is preferable, and a liquid crystal cell is more preferable. That is, as the image display device according to the embodiment of the invention, a liquid crystal display device using a liquid crystal cell as a display element, or an organic EL display device using an organic EL display panel as a display element is preferable, and a liquid crystal display device is more preferable.

[Liquid Crystal Display Device]

A liquid crystal display device as an example of the image display device according to the embodiment of the invention preferably has an aspect in which it has the above-described light absorption anisotropic film and a liquid crystal cell. More preferably, the liquid crystal display device has the above-described laminate (but including no λ/4 plate) and a liquid crystal cell.

In the invention, it is preferable that the light absorption anisotropic film (laminate) according to the embodiment of the invention be used as a polarizing element on the front side among light absorption anisotropic films (laminates) to be provided on both sides of a liquid crystal cell, and it is more preferable that the light absorption anisotropic film (laminate) according to the embodiment of the invention be used as polarizing elements on the front side and the rear side.

Hereinafter, the liquid crystal cell of the liquid crystal display device will be described in detail.

<Liquid Crystal Cell>

The liquid crystal cell used for the liquid crystal display device is preferably a vertical alignment (VA) mode, an optically compensated bend (OCB) mode, an in-plane-switching (IPS) mode, or a twisted nematic (TN) mode, but is not limited thereto.

In a TN mode liquid crystal cell, with no application of a voltage, rod-like liquid crystalline molecules are substantially horizontally aligned, and twist-aligned by 60° to 120°. The TN mode liquid crystal cell is most frequently used as a color thin film transistor (TFT) liquid crystal display device, and is described in many literatures.

In a VA mode liquid crystal cell, rod-like liquid crystalline molecules are substantially vertically aligned with no application of a voltage. The VA mode liquid crystal cell includes (1) a narrowly-defined VA mode liquid crystal cell in which rod-like liquid crystalline molecules are substantially vertically aligned with no application of a voltage, and are substantially horizontally aligned with the application of a voltage (described in JP1990-176625A (JP-H2-176625A)), (2) a (MVA mode) liquid crystal cell in which the VA mode is made into multi-domains in order to expand the viewing angle (described in SID97, Digest of tech. Papers (proceedings) 28 (1997) 845), (3) an (n-ASM mode) liquid crystal cell in which rod-like liquid crystalline molecules are substantially vertically aligned with no application of a voltage, and are twisted in multi-domains with the application of a voltage (described in the proceedings 58 and 59 of Japanese Liquid Crystal Conference (1998)), and (4) a SURVIVAL mode liquid crystal cell (announced at LCD internal 98). In addition, the VA mode liquid crystal cell may be any one of a patterned vertical alignment (PVA) type, an optical alignment type, or a polymer-sustained alignment (PSA) type. Details of these modes are described in JP2006-215326A and JP2008-538819A.

In an IPS mode liquid crystal cell, rod-like liquid crystalline molecules are substantially horizontally aligned with respect to a base, and the liquid crystalline molecules respond in a planar manner with the application of an electric field parallel to a base surface. The IPS mode displays a black image in a state in which no electric field is applied thereto, and the absorption axes of a pair of upper and lower polarizing plates are perpendicular to each other. A method of improving the viewing angle by reducing light leakage caused when a black image is displayed in an oblique direction using an optical compensation sheet is disclosed by JP1998-054982A (JP-H10-054982A), JP1999-202323A (JP-H11-202323A), JP1997-292522A (JP-H9-292522A), JP1999-133408A (JP-H1-133408A), JP1999-305217A (JP-H11-305217A), JP1998-307291A (JP-H10-307291A), and the like.

[Organic EL Display Device]

An organic EL display device as an example of the image display device according to the embodiment of the invention preferably has an aspect in which it has a light absorption anisotropic film, a λ/4 plate, and an organic EL display panel in this order from the visual recognition side.

More preferably, the organic EL display device has the above-described laminate having a λ/4 plate and an organic EL display panel in this order from the visual recognition side. In this case, the laminate has a base, an alignment film to be provided as necessary, a light absorption anisotropic film, and a λ/4 plate disposed in this order from the visual recognition side.

In addition, the organic EL display panel is a display panel configured using an organic EL element in which an organic light emitting layer (organic electroluminescence layer) is interposed between electrodes (between a cathode and an anode). The configuration of the organic EL display panel is not particularly limited, and a known configuration is employed.

EXAMPLES

Hereinafter, the invention will be more specifically described based on examples. Materials, used amounts, ratios, treatment contents, treatment procedures, and the like shown in the following examples are able to be properly changed without departing from the gist of the invention. Therefore, the scope of the invention will not be restrictively interpreted by the following examples.

[Synthesis of Dichroic Substance I-10]

A dichroic substance I-10 was synthesized as follows.

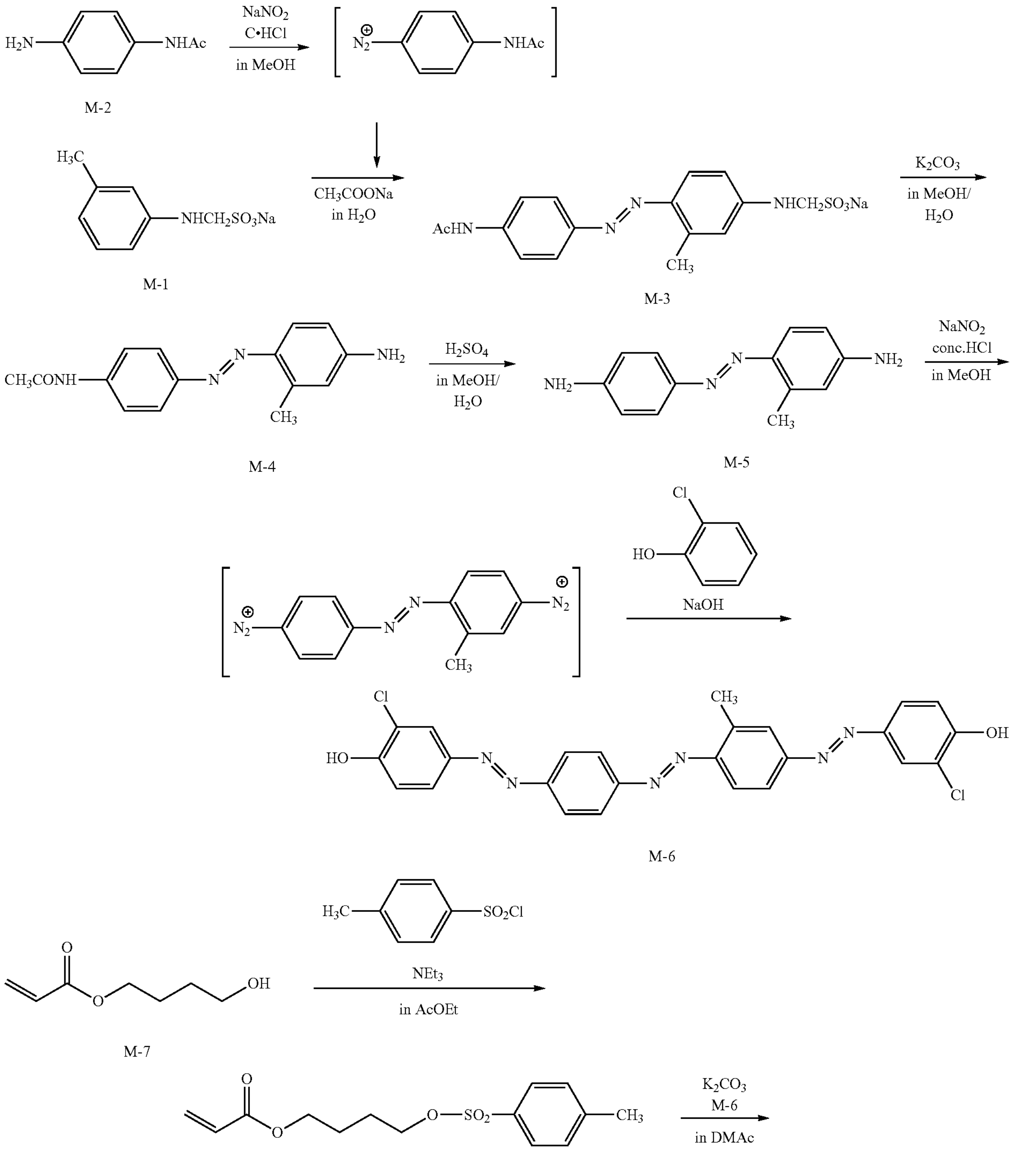

M-2, M-1, M-3, M-4, M-5, M-6, M-7, M-8

-continued

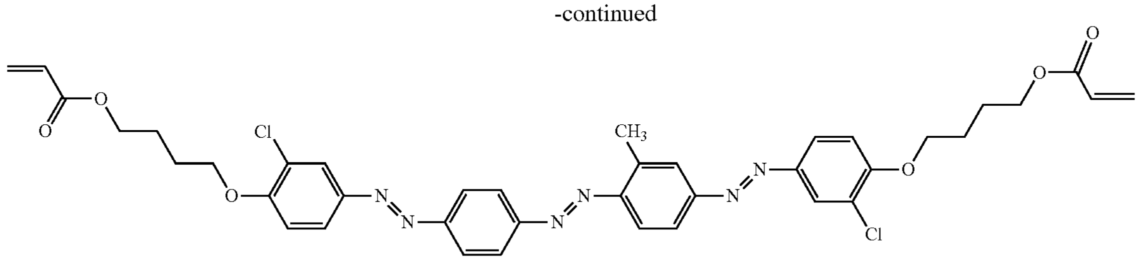

I-10

In the formulae, "Ac" represents an acetyl group, "Me" represents a methyl group, "Et" represents an ethyl group, and "DMAc" represents dimethylacetamide.

<Step 1 Synthesis of M-1>

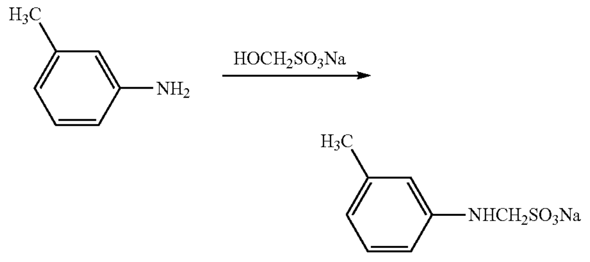

M-1

175 ml of ethanol and 40 ml of water were added to 32.2 g (0.3 mol) of m-toluidine (manufactured by FUJIFILM Wako Pure Chemical Corporation), and the mixture was stirred at room temperature. To this solution, 48.3 g (0.36 mol) of sodium hydroxymethanesulfonate (manufactured by Tokyo Chemical Industry Co., Ltd.) was added, and the mixture was heated to an external temperature of 100° C. and stirred for 5 hours. After completion of the reaction, the reaction mixture was cooled to room temperature, subjected to filtering, and washed with ethanol. The resulting crystals were dried to obtain 48.8 g of M-1 (yield: 72.8%, white crystals).

<Step 2 Synthesis of M-4>

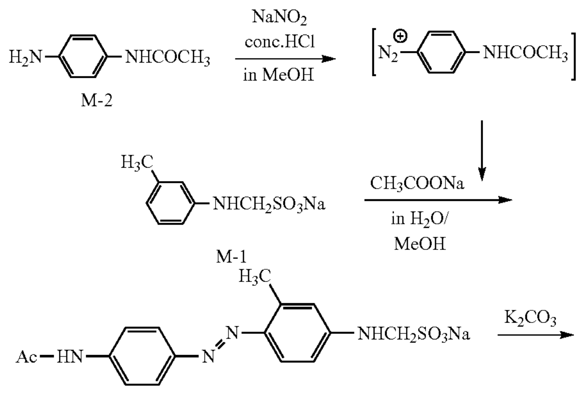

M-3

-continued

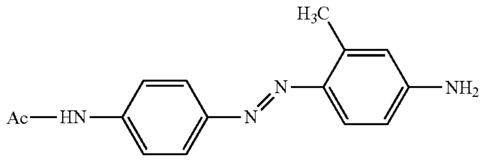

M-4

150 ml of methanol was added to 10.0 g (0.067 mol) of p-acetylaminoaniline (manufactured by Tokyo Chemical Industry Co., Ltd.), and the mixture was cooled to −5° C. and stirred. To this solution, 17.1 ml of a concentrated hydrochloric acid was added dropwise. Next, an aqueous solution in which 5.5 g (0.08 mol) of sodium nitrite (manufactured by FUJIFILM Wako Pure Chemical Corporation) was dissolved in 10 ml of water was added dropwise. The internal temperature was kept at −5° C. to 5° C. After completion of the dropwise addition, the mixture was stirred for 1 hour at 0° C. or lower to prepare a diazonium salt solution.

150 ml of water was added to M-1 (15.0 g, 0.067 mol), and the mixture was stirred for dissolving. To this aqueous solution, 30 ml of methanol and 14.8 g (0.18 mol) of sodium acetate were added, and the mixture was cooled to 0° C. and stirred. To this solution, the diazonium salt solution prepared by the above method was added dropwise at 0° C. to 5° C. After completion of the dropwise addition, the mixture was stirred for 1 hour at 5° C., and then stirred for 1 hour at room temperature, and the reaction was completed. Next, to this solution, an aqueous solution in which 46 g (0.335 mol) of potassium carbonate was dissolved in 100 ml of water was slowly added, and the mixture was heated to 80° C. and stirred for 4 hours. After completion of the reaction, the reaction mixture was cooled to room temperature, and the precipitated crystals were filtered to obtain 15.35 g of M-4 (yield: 85.9%, yellow crystals).

<Step 3 Synthesis of M-5>

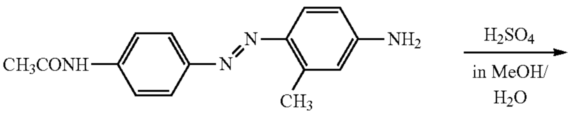

M-4

-continued

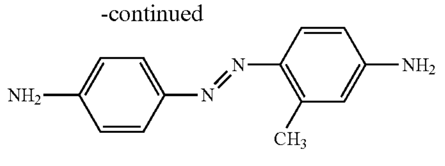

M-5

400 ml of methanol and 20 ml of water were added to M-4 (15.0 g), and the mixture was stirred at room temperature. To this dispersion, 17.8 ml of a concentrated sulfuric acid was added dropwise. The dispersion was heated to reflux and stirred for 8 hours, and the hydrolysis was completed. To this solution, 300 ml of water was added, and the pH was adjusted to about 10 with an aqueous solution of 20% sodium hydroxide. The precipitated crystals were filtered, washed with water, and dried at 60° C. M-5 (11.7 g) (yield: 96.4%, yellow crystals) was obtained.

<Step 4 Synthesis of M-6>

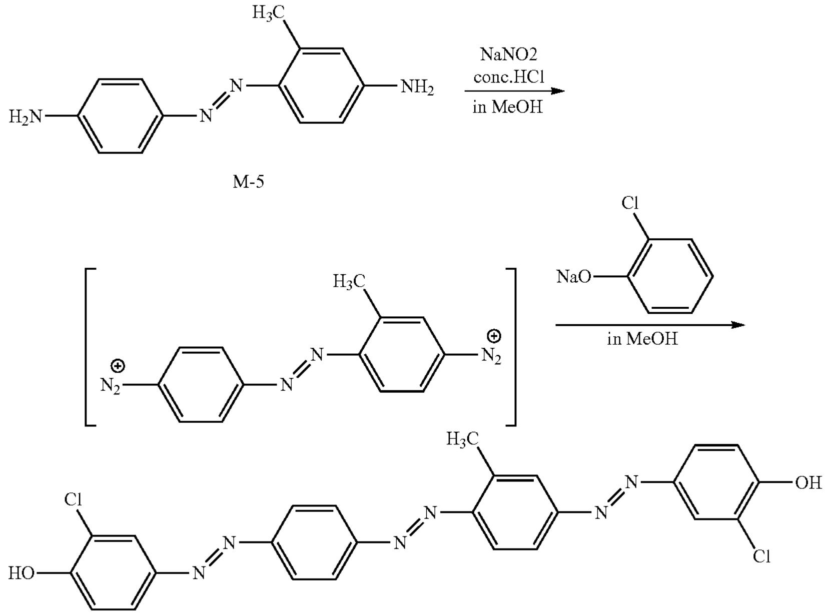

M-5

M-6

30 ml of methanol and 10 ml of water were added to M-5 (1.13 g, 5 mmol), and the mixture was stirred at room temperature. To this solution, 4.3 ml (50 mmol) of a concentrated hydrochloric acid was added, and the mixture was cooled to −5° C. and stirred. To this solution, an aqueous solution in which 2.07 g (30 mmol) of sodium nitrite was dissolved in 8 ml of water was added dropwise. The internal temperature was kept at 2° C. or lower. After completion of the dropwise addition, the mixture was stirred for 1.5 hours at −5° C. to 0° C. to prepare a diazonium salt solution.

3.76 g (40 mmol) of 2-chlorophenol (manufactured by FUJIFILM Wako Pure Chemical Corporation) and 1.6 g (40 mmol) of sodium hydroxide were dissolved in 10 ml of water and 30 ml of methanol, and the mixture was cooled to 0° C. and stirred. To this solution, the diazonium salt solution prepared by the above method was added dropwise. The internal temperature was kept at 5° C. or lower. After completion of the dropwise addition, the mixture was stirred for 30 minutes at 10° C. or lower, and then stirred for 1 hour at room temperature. After completion of the reaction, 100 ml of water was added, and then the pH was adjusted to 2 to 3 by adding a hydrochloric acid dropwise to precipitate crystals. The crystals were filtered, washed with water, and dried. 2.14 g (yield: 98.2%, yellow crystals) of M-6 was obtained.

<Step 5 Synthesis of M-8>

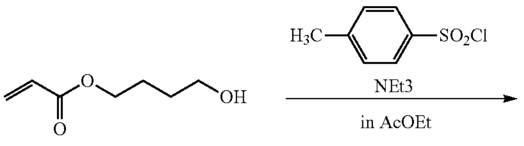

M-7

-continued

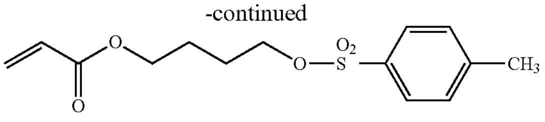

M-8

50 ml of ethyl acetate was added to 13.0 g (0.09 mol) of M-7 (manufactured by Tokyo Chemical Industry Co., Ltd.) and 0.6 g of dibutylhydroxytoluene (BHT), and the mixture was cooled to 5° C. and stirred. To this solution, 15 ml of triethylamine was added, and then 18.9 g (0.099 mol) of p-toluenesulfonic acid chloride (manufactured by Tokyo Chemical Industry Co., Ltd.) was added. After completion of the addition, the mixture was stirred for 1 hour at 5° C. to 10° C., and then stirred for 18 hours at room temperature. After completion of the reaction, 50 ml of water was added to the reaction liquid, and the mixture was stirred for 1 hour for extraction. The ethyl acetate solution was washed with saturated saline and dried with anhydrous sodium sulfate. 0.5 g of BHT was added to the ethyl acetate, and the ethyl acetate was distilled off under reduced pressure. 28.9 g of M-8 (transparent liquid) was obtained.

<Step 6 Synthesis of I-10>

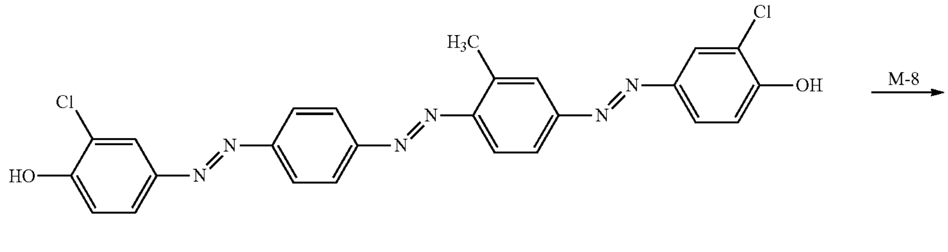

M-6

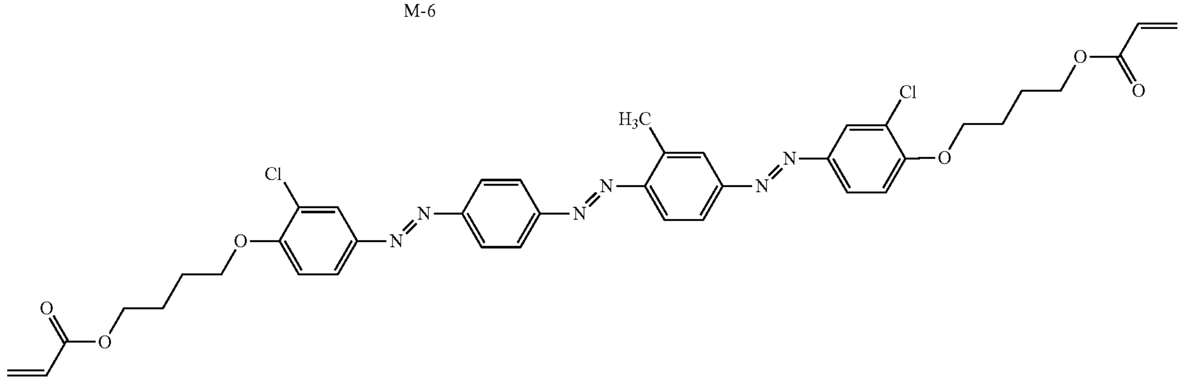

I-10

3 ml of dimethylacetamide was added to M-6 (218 mg, 0.5 mmol), 500 mg (3.6 mmol) of potassium carbonate, and 83 mg of potassium iodide, and the mixture was heated and stirred at 60° C. To this solution, the above M-8 (600 mg) was added dropwise. After completion of the dropwise addition, the mixture was heated to 80° C. and stirred for 5 hours, and the reaction was completed. After completion of the reaction, the reaction liquid was poured into water and acidified with a hydrochloric acid. The precipitated crystals were filtered and washed with water. The crystals were heated, dispersed, and washed with methanol, and dried. The crystals were separated and purified by silica gel column chromatography (eluant: chloroform-=chloroform/ethyl acetate=50/1). To the residues, methanol was added, and the precipitated crystals were filtered, washed with methanol, and dried. I-10 (220 mg, yield: 63.9%, yellow crystals) was obtained.

[Dichroic Substances I-2, I-7, I-12, I-13, and I-15]

Dichroic substances I-2, I-7, I-12, I-13, and I-15 were synthesized with reference to the synthesis method of the dichroic substance I-10 described above.

[Synthesis of Dichroic Substance II-1]

A dichroic substance II-1 was synthesized as follows.

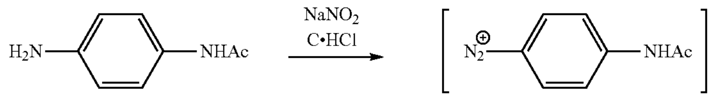

M-2

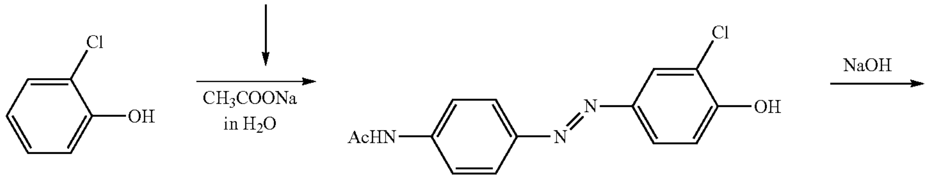

M-9

-continued

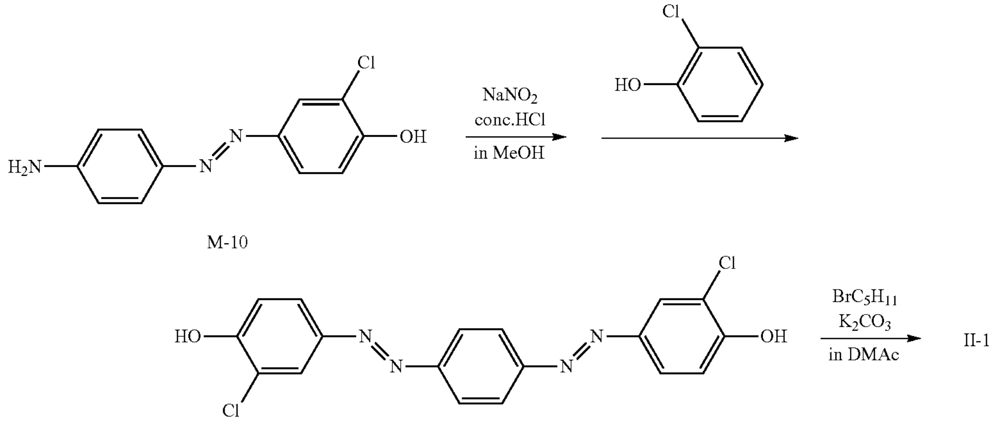

M-10

M-11

II-1

<Step 1 Synthesis of M-9>

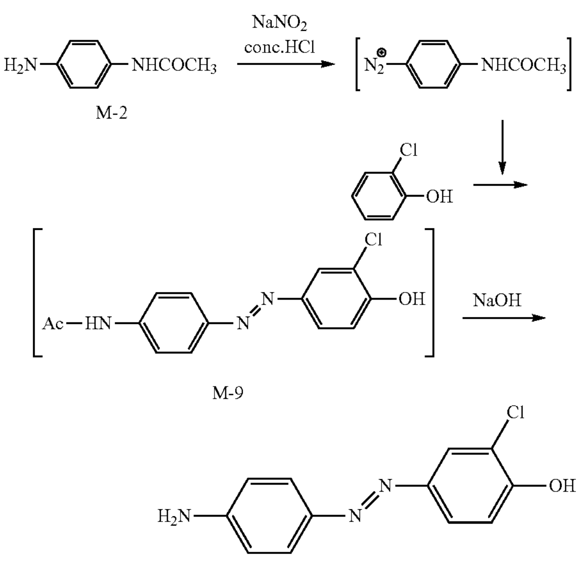

M-2

M-9

M-10

13 ml of water was added to 5.4 g (0.036 mol) of p-acetylaminoaniline (manufactured by Tokyo Chemical Industry Co., Ltd.), and the mixture was cooled to −5° C. and stirred. To this solution, 13 ml of a concentrated hydrochloric acid was added dropwise. Next, an aqueous solution in which 2.61 g (0.038 mol) of sodium nitrite (manufactured by FUJIFILM Wako Pure Chemical Corporation) was dissolved in 7 ml of water was added dropwise. The internal temperature was kept at −5° C. to 5° C. After completion of the dropwise addition, the mixture was stirred for 1 hour at 0° C. or lower to prepare a diazonium salt solution.

50 ml of water was added to 4.1 g (0.035 mol) of orthochlorophenol (manufactured by FUJIFILM Wako Pure Chemical Corporation), and the mixture was stirred for dissolving. To this aqueous solution, 7.0 g (0.18 mol) of NaOH was added, and the mixture was cooled to 0° C. and stirred. To this solution, the diazonium salt solution prepared by the above method was added dropwise at 0° C. to 5° C. After completion of the dropwise addition, the mixture was stirred for 1 hour at 5° C., and then stirred for 1 hour at room temperature, and the reaction was completed. Next, to this solution, an aqueous hydrochloric acid solution was slowly added for neutralization, and the precipitated crystals were separated by filtering. The obtained crude crystals were added to 350 ml of an aqueous solution of 10% NaOH, and heated to reflux for 2 hours. After completion of the reaction, the reaction mixture was cooled to room temperature, and an aqueous hydrochloric acid solution was added to adjust the pH to 6.0. The precipitated crystals were filtered to obtain 5.2 g of M-10 (yield: 60.0%, brown crystals).

<Step 2 Synthesis of M-1>

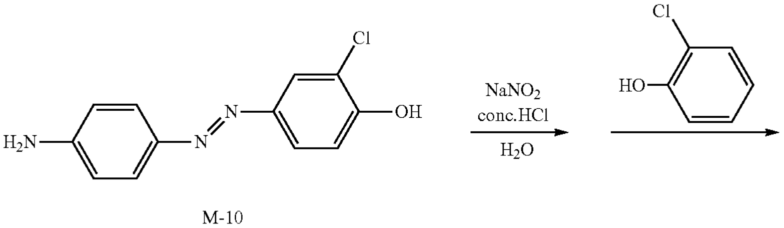

M-10

-continued

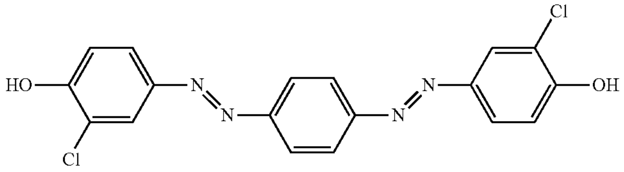

M-11

13 ml of water was added to M-10 (5.2 g, 0.021 mol), and the mixture was cooled to −5° C. and stirred. To this solution, 13 ml of a concentrated hydrochloric acid was added dropwise. Next, an aqueous solution in which 1.7 g (0.024 mol) of sodium nitrite (manufactured by FUJIFILM Wako Pure Chemical Corporation) was dissolved in 4 ml of water was added dropwise. The internal temperature was kept at −5° C. to 5° C. After completion of the dropwise addition, the mixture was stirred for 1 hour at 0° C. or lower to prepare a diazonium salt solution.

30 ml of water was added to 3.1 g (0.025 mol) of orthochlorophenol (manufactured by FUJIFILM Wako Pure Chemical Corporation), and the mixture was stirred for dissolving. To this aqueous solution, 3.0 g (0.12 mol) of NaOH was added, and the mixture was cooled to 0° C. and stirred. To this solution, the diazonium salt solution prepared by the above method was added dropwise at 0° C. to 5° C. After completion of the dropwise addition, the mixture was stirred for 1 hour at 5° C., and then stirred for 1 hour at room temperature, and the reaction was completed. Next, to this solution, an aqueous hydrochloric acid solution was slowly added for neutralization, the precipitated crystals were separated by filtering, and M-11 (5.8 g, 71%, brown crystals) was obtained.

<Step 3 Synthesis of II-1>

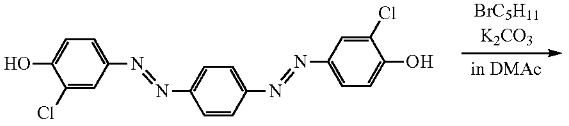

M-11

II-1

6 ml of dimethylacetamide was added to M-11 (387 mg, 1 mmol), 1 g (7.2 mmol) of potassium carbonate, and 160 mg of potassium iodide, and the mixture was heated and stirred at 60° C. To this solution, 0.9 g (6 mmol) of bromopentane (manufactured by Tokyo Chemical Industry Co., Ltd.) was added dropwise. After completion of the dropwise addition, the mixture was heated to 80° C. and stirred for 3 hours, and the reaction was completed. After completion of the reaction, the reaction liquid was poured into water and acidified with a hydrochloric acid. The precipitated crystals were filtered and washed with water. The crystals were heated, dispersed, and washed with methanol, and dried. The crystals were separated and purified by silica gel column chromatography (eluant: chloroform, chloroform/ethyl acetate=50/1). To the residues, methanol was added, and the precipitated crystals were filtered, washed with methanol, and dried. In this manner, II-1 (360 mg, yellow crystals) was obtained.

[Dichroic Substances II-4 and II-7]

Dichroic substances II-4 and II-7 were synthesized with reference to the synthesis method of the dichroic substance H-1 described above.

[Dichroic Substances H-1 to H-5]

Dichroic substances H-1 to H-5 were prepared.

Structures, HOMO energy levels, and CLogP values of the dichroic substances are shown below. The HOMO energy levels and the CLogP values were calculated by the above-described methods, respectively.

(I-2)

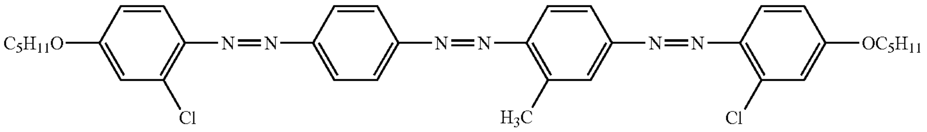

HOMO = -5.61
ClogP = 14.0

(I-7)

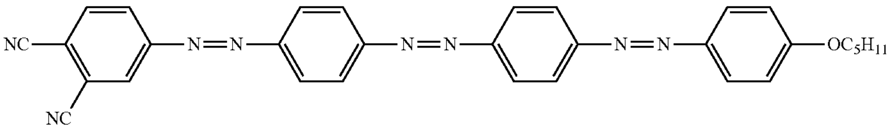

HOMO = -5.83
ClogP = 9.1

-continued
(I-10)
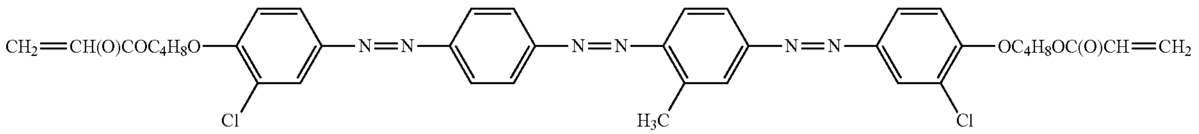
HOMO = -5.61
ClogP = 12.1
(I-12)
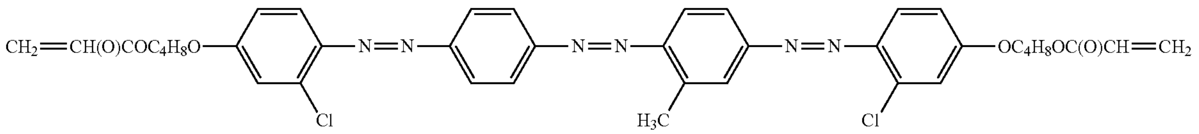
HOMO = -5.63
ClogP = 12.6
(I-13)
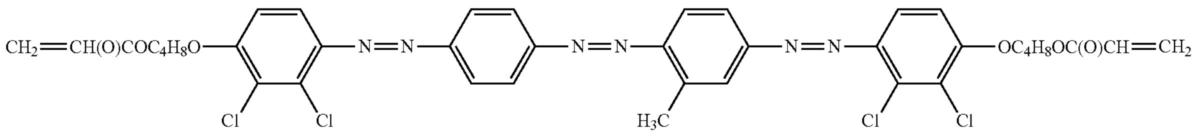
HOMO = -5.68
ClogP = 13.3
(I-15)
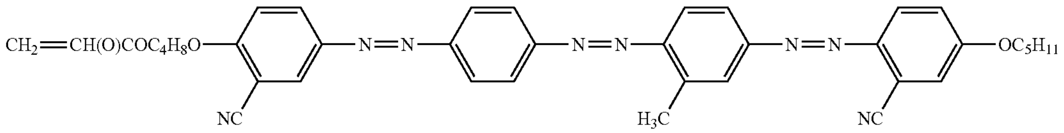
HOMO = -5.88
ClogP = 11.1
(II-1)
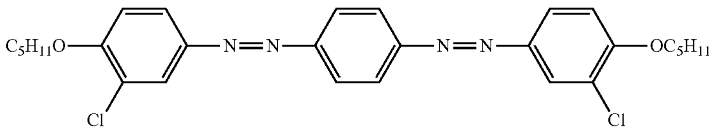
HOMO = -5.62
ClogP = 11.6
(II-4)
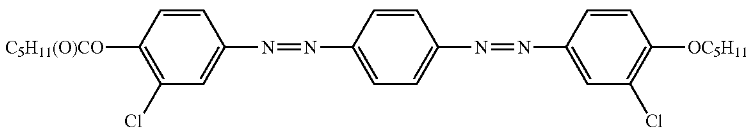
HOMO = -5.69
ClogP = 7.10
(II-7)
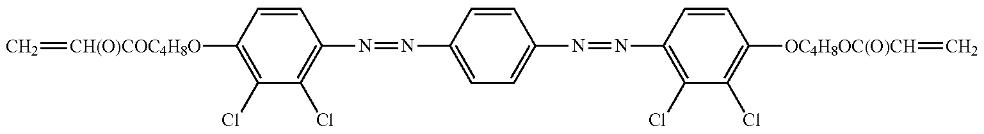
HOMO = -5.69
ClogP = 10.9
(H-1)
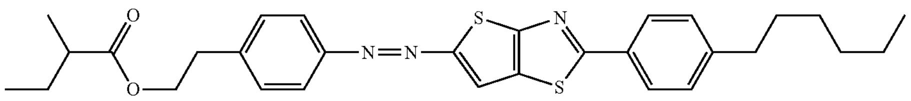
HOMO = -5.50
ClogP = 10.3

-continued (H-2)

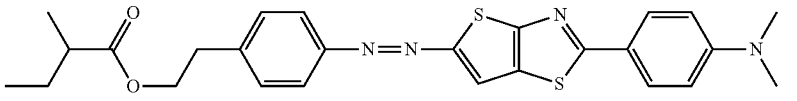

HOMO = -5.21
ClogP = 7.9

(H-3)

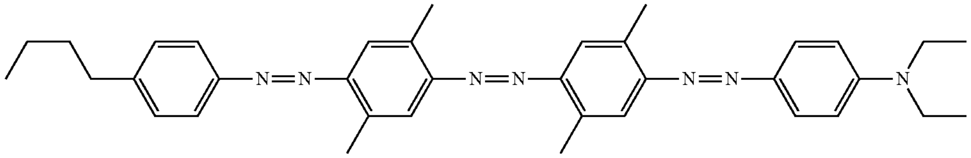

HOMO = -5.30
ClogP = 13.5

(H-4)

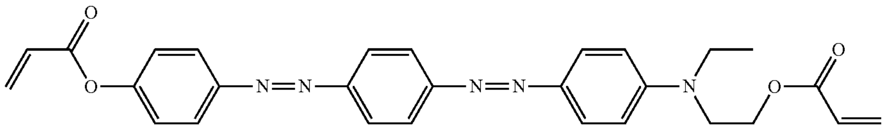

HOMO = -5.38
ClogP = 7.7

(H-5)

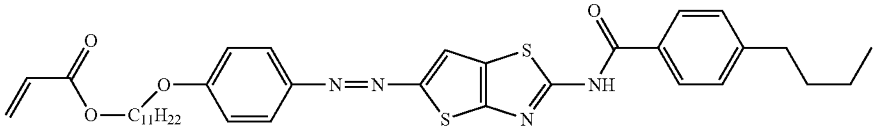

HOMO = -5.21
ClogP = 12.2

<Light Fastness of Dichroic Substance>

A chloroform solution whose concentration was adjusted such that the absorbance was 2.0 with regard to each of the dichroic substances I-7, I-10, I-12, and H-1 to H-5 was put into a 1 cm glass cell, and measurement samples were obtained. A spectrophotometer (manufactured by Shimadzu Corporation, product name UV-3600) was used to measure the absorbance.

Each measurement sample was set in a light fastness tester (manufactured by Eagle Engineering, trade name "Merry-Go-Round light fastness tester"), and irradiated with light from a xenon lamp light source at 120,000 lux for 200 hours (integrated light quantity: 24,000,000 lux-h). The xenon lamp light source was mounted with an ultraviolet cut filter of 370 nm.

The absorbance of each measurement sample after the light irradiation was measured, and a decomposition rate (%) of the dichroic substance in each measurement sample was obtained by the following expression.

$$\text{Decomposition Rate (\%)} = 100 \times (\text{Absorbance After Irradiation}/2.0)$$

FIG. 1 shows a relationship between the decomposition rates and the HOMO energy levels of the dichroic substances.

As shown in FIG. 1, it has been found that in cases of the dichroic substances I-7, I-10, and I-12 exhibiting a HOMO energy level of −5.60 eV or less, the decomposition rate of the dichroic substance by light irradiation is much lower than in cases of the dichroic substances H-1 to H-5 exhibiting a HOMO energy level greater than −5.60 eV.

Example 1

A light absorption anisotropic film was produced using a composition of Example 1 to be described later on an alignment film 1 produced as follows.

<Production of Alignment Film 1>

A glass base (manufactured by Central Glass Co., Ltd., blue plate glass, size: 300 mm×300 mm, thickness: 1.1 mm) was washed with an alkaline detergent, and then pure water was poured thereto. After that, the glass base was dried.

The following alignment film forming composition 1 was applied to the glass base after the drying using a bar #12, and the applied alignment film forming composition 1 was dried for 2 minutes at 110° C. to form a coating film on the glass base.

The obtained coating film was subjected to a rubbing treatment (rotation speed of roller: 1,000 rotations/2.9 mm, stage speed: 1.8 m/min) once to produce an alignment film 1 on the glass base.

| Composition of Alignment Film Forming Composition 1 | |
|---|---|
| Modified Vinyl Alcohol (see Formula (PVA-1)) | 2.00 parts by mass |
| Water | 74.16 parts by mass |

-continued

| Composition of Alignment Film Forming Composition 1 | |
|---|---|
| Methanol | 23.78 parts by mass |
| Photopolymerization Initiator (IRGACURE 2959, manufactured by BASF SE) | 0.06 parts by mass |
| 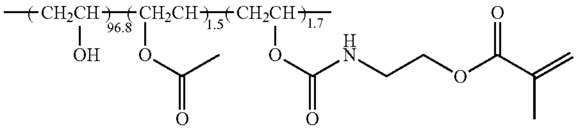 | (PVA-1) |

Each of the numerical values attached to the repeating units of Formula (PVA-1) represents a molar ratio of the repeating unit.

<Production of Light Absorption Anisotropic Film>

The obtained alignment film 1 was spin-coated with a composition of Example 1 (see the following composition) using a spin coater at a rotation speed of 1,000 rotations/30 seconds, and then dried at room temperature for 30 seconds. Thus, a coating film was formed on the alignment film 1. Next, the obtained coating film was heated for 15 seconds at 180° C., and then cooled to room temperature to produce a light absorption anisotropic film of Example 1 on the alignment film 1.

| Composition of Composition of Example 1 | |
|---|---|
| Liquid Crystalline Compound A-1 (Formula (A-1)) | 4.81 parts by mass |
| Dichroic Substance I-10 (Formula (I-10)) | 1.69 parts by mass |

-continued

| Composition of Composition of Example 1 | |
|---|---|
| Interface Improver F1 (Formula (F1)) | 0.04 parts by mass |
| Cyclopentanone (solvent) | 93.46 parts by mass |

Examples 2 to 15 and Comparative Examples 1 to 5

A light absorption anisotropic film was produced on the alignment film 1 in the same manner as in Example 1, except that the kind or the content of the liquid crystalline compound or the dichroic substance in the composition was changed as shown in the following Table 1.

Two kinds of dichroic substances were used for the compositions used for producing the light absorption anisotropic films of Examples 2, 3, 5, and 6. Structures of the components used in Examples 1 to 15 and Comparative Examples 1 to 5 are shown below.

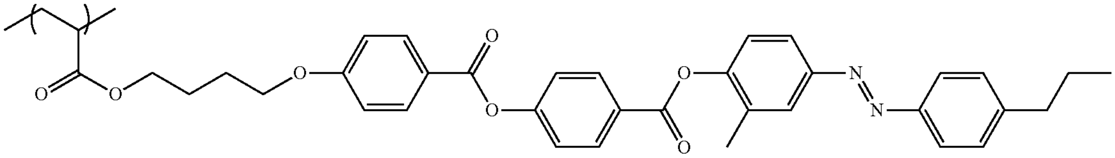

(A-1)

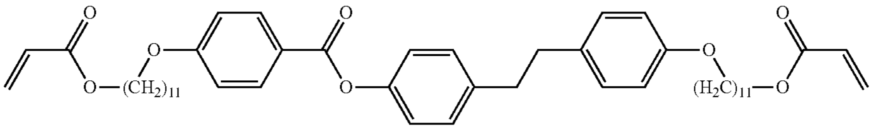

(A-2)

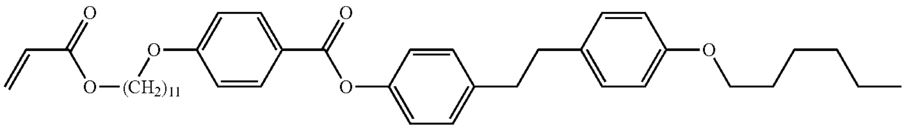

(A-3)

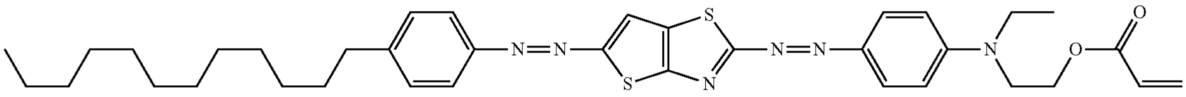

(J-1)

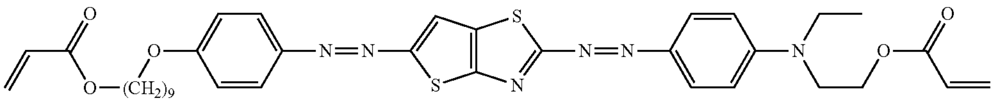

(J-2)

-continued (F1)

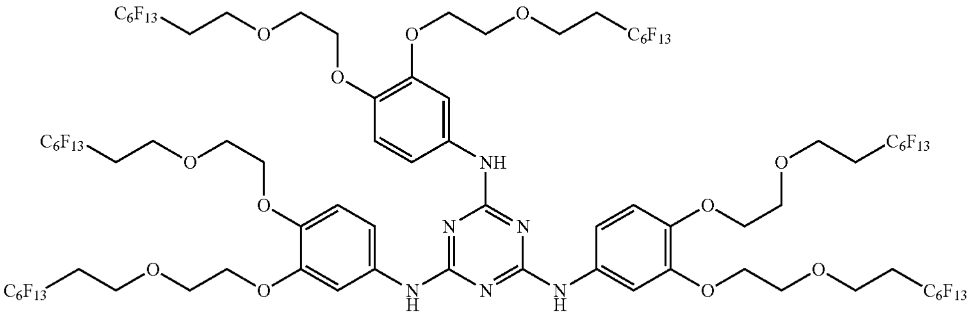

<Light Fastness of Light Absorption Anisotropic Film>

The light fastness of the light absorption anisotropic films of Examples 1 to 15 and Comparative Examples 1 to 5 was evaluated by measuring a dichroic ratio before and after the light fastness test. The smaller the decrease of the dichroic ratio after the light fastness test, the better the light fastness. The dichroic ratios before and after the light fastness test are shown in the following Table 1.

(Method of Measuring Dichroic Ratio)

In a state in which a linear polarizer was inserted on the light source side of an optical microscope (manufactured by Nikon Corporation, product name "ECLIPSE E600 POL"), the light absorption anisotropic film of each of the examples and the comparative examples was set on a sample stand, and an absorbance of the light absorption anisotropic film in a wavelength region of 400 to 700 nm was measured using a multi-channel spectroscope (manufactured by Ocean Optics, Inc., product name "QE65000") to calculate a dichroic ratio by the following formula.

$$\text{Dichroic Ratio } (D0)=Az0/Ay0$$

In the formula, "Az0" represents an absorbance of the light absorption anisotropic film with respect to polarization in an absorption axis direction, and "Ay0" represents an absorbance of the light absorption anisotropic film with respect to polarization in a polarization axis direction.

(Light Fastness Test Method)

The glass base having the light absorption anisotropic film of each of the examples and the comparative examples formed thereon was set in a light fastness tester (manufactured by Suga Test Instruments Co., Ltd., trade name "xenon weather meter X25"), and the glass base surface on which the light absorption anisotropic film was formed was irradiated with light from a xenon lamp light source at 120,000 lux for 200 hours (integrated light quantity: 24,000,000 lux·h). The xenon lamp light source was mounted with an ultraviolet cut filter of 370 nm.

TABLE 1

| | Dichroic Substance 1 | | | | Dichroic Substance 2 | | | | Liquid Crystalline Compound | | Light Fastness | |
|---|---|---|---|---|---|---|---|---|---|---|---|---|
| | Kind | HOMO (eV) | CLogP Value | Content (parts by mass) | Kind | HOMO (eV) | CLogP Value | Content (parts by mass) | Kind | Content (parts by mass) | Dichroic Ratio Before Light Irradiation | Dichroic Ratio After Light Irradiation |
| Example 1 | I-10 | −5.61 | 12.1 | 1.69 | — | — | — | — | A-1 | 4.81 | 32 | 31 |
| Example 2 | I-10 | −5.61 | 12.1 | 1.69 | J-1 | −5.19 | 13.8 | 1.69 | A-1 | 4.81 | 35 | 35 |
| Example 3 | I-10 | −5.61 | 12.1 | 1.69 | J-2 | −5.20 | 11.6 | 1.69 | A-1 | 4.81 | 38 | 38 |
| Example 4 | I-12 | −5.63 | 12.6 | 1.69 | — | — | — | — | A-1 | 4.81 | 31 | 30 |
| Example 5 | I-12 | −5.63 | 12.6 | 1.69 | J-1 | −5.19 | 13.8 | 1.69 | A-1 | 4.81 | 36 | 36 |
| Example 6 | I-12 | −5.63 | 12.6 | 1.69 | J-2 | −5.20 | 11.6 | 1.69 | A-1 | 4.81 | 36 | 36 |
| Example 7 | I-13 | −5.68 | 13.3 | 1.69 | — | — | — | — | A-1 | 4.81 | 28 | 27 |
| Example 8 | I-7 | −5.83 | 9.1 | 1.69 | — | — | — | — | A-1 | 4.81 | 28 | 28 |
| Example 9 | I-15 | −5.88 | 11.1 | 1.69 | — | — | — | — | A-1 | 4.81 | 29 | 29 |
| Example 10 | I-2 | −5.61 | 14.0 | 1.69 | — | — | — | — | A-1 | 4.81 | 29 | 28 |
| Example 11 | II-7 | −5.72 | 10.9 | 1.69 | — | — | — | — | A-1 | 4.81 | 26 | 24 |
| Example 12 | II-1 | −5.62 | 11.6 | 1.69 | — | — | — | — | A-1 | 4.81 | 28 | 27 |
| Example 13 | II-4 | −5.69 | 7.1 | 1.69 | — | — | — | — | A-1 | 4.81 | 29 | 28 |
| Example 14 | I-10 | −5.61 | 12.1 | 1.69 | — | — | — | — | A-2 | 4.81 | 24 | 23 |
| Example 15 | I-10 | −5.61 | 12.1 | 1.69 | — | — | — | — | A-3 | 4.81 | 22 | 21 |
| Comparative Example 1 | H-1 | −5.50 | 10.3 | 1.69 | — | — | — | — | A-1 | 4.81 | 33 | 23 |
| Comparative Example 2 | H-2 | −5.21 | 7.9 | 1.69 | — | — | — | — | A-1 | 4.81 | 27 | 12 |
| Comparative Example 3 | H-3 | −5.30 | 13.5 | 1.69 | — | — | — | — | A-1 | 4.81 | 26 | 14 |
| Comparative Example 4 | H-4 | −5.38 | 7.7 | 1.69 | — | — | — | — | A-1 | 4.81 | 28 | 19 |
| Comparative Example 5 | H-5 | −5.21 | 12.2 | 1.69 | — | — | — | — | A-1 | 4.81 | 25 | 9 |

As shown in Table 1, it has been found that a light absorption anisotropic film having excellent light fastness can be obtained in a case where a dichroic substance exhibiting a HOMO energy level of −5.60 eV or less is used (Examples 1 to 15).

In contrast, it has been found that the light fastness of the light absorption anisotropic film decreases in a case where a dichroic substance exhibiting a HOMO energy level greater than −5.60 eV is used (Comparative Examples 1 to 5).

Example 16

A light absorption anisotropic film was produced using a composition of Example 16 to be described later on an alignment film 2 produced as follows.

<Production of Alignment Film 2>

A transparent base film (manufactured by FUJIFILM Corporation, cellulose acylate-based film, trade name "FUJITAC TG40UL") was prepared and subjected to a saponification treatment to make a surface hydrophilic. Then, the following alignment film forming composition 2 was applied to the transparent base film using a bar #12, and the applied alignment film forming composition 2 was dried for 2 minutes at 110° C. to form an alignment film 2 on the transparent base film.

| Composition of Alignment Film Forming Composition 2 | |
|---|---|
| Modified Vinyl Alcohol (see Formula (PVA-1)) | 2.00 parts by mass |
| Water | 74.08 parts by mass |
| Methanol | 23.76 parts by mass |
| Photopolymerization Initiator (IRGACURE 2959, manufactured by BASF SE) | 0.06 parts by mass |

<Production of Light Absorption Anisotropic Film>

The obtained alignment film 2 was spin-coated with a composition of Example 16 (see the following composition) using a spin coater at a rotation speed of 1,000 rotations/30 seconds, and then dried at room temperature for 30 seconds. Thus, a coating film was formed on the alignment film 2. Next, the obtained coating film was heated for 30 seconds at 140° C., and then cooled to room temperature. Next, the coating film was reheated to 80° C. and held for 30 seconds. Then, the coating film was cooled to room temperature. In this manner, a light absorption anisotropic film of Example 16 was produced on the alignment film

| Composition of Composition of Example 16 | |
|---|---|
| Dichroic Substance J-2 (Formula (J-2)) | 9.63 parts by mass |
| Dichroic Substance I-10 (Formula (I-10)) | 7.92 parts by mass |
| Liquid Crystalline Compound A-4 (Formula (A-4)) | 40.11 parts by mass |
| Interface Improver F2 (see Formula (F2)) | 0.73 parts by mass |
| Interface improver F3 (see Formula (F3)) | 0.73 parts by mass |
| Interface Improver F4 (see Formula (F4)) | 0.87 parts by mass |
| Tetrahydrofuran (solvent) | 799.0 parts by mass |
| Cyclopentanone (solvent) | 141.0 parts by mass |
| Oxidant (X-1) (see Formula (X-1)) | 0.87 parts by mass |

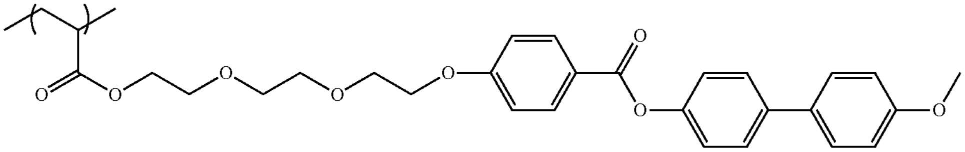

A-4

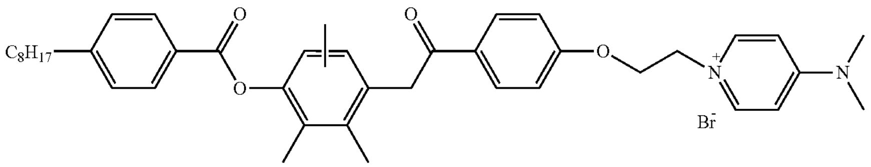

F2

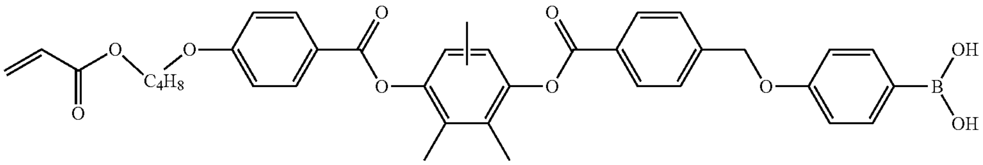

F3

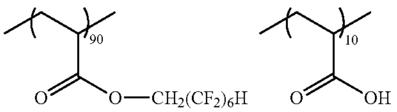

F4

-continued

| Composition of Composition of Example 16 | |
|---|---|
| 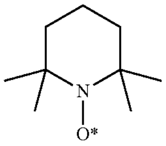 | X1 |

<Light Fastness of Light Absorption Anisotropic Film>

The light fastness of the light absorption anisotropic film of Example 16 was measured in the same manner as in Examples 1 to 15 and Comparative Examples 1 to 5, and the dichroic ratios before and after the light irradiation were all 32.

It has been found that a light absorption anisotropic film having excellent light fastness can be obtained in a case where a dichroic substance exhibiting a HOMO energy level of −5.60 eV or less is used.

What is claimed is:

1. A composition comprising:

a dichroic substance having an azo group, wherein the dichroic substance exhibits a CLogP value of 7.0 or greater, the dichroic substance is represented by Formula (2):

(2)

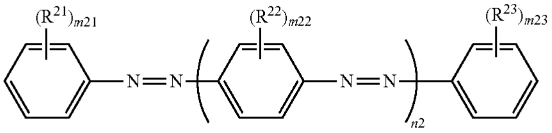

in Formula (2), m21 and m23 each independently represent an integer of 1 to 5, m22 represents an integer of 0 to 4, and n2 represents an integer of 2, and in Formula (2), $R^{21}$, $R^{22}$, and $R^{23}$ each independently represent a substituent, the substituent in $R^{21}$ and the substituent in $R^{23}$ are each independently a trifluoromethyl group, an alkoxycarbonyl group, an alkyl group, an alkenyl group a heterocyclic group, a halogen atom, a cyano group, a nitro group, a mercapto group, a hydroxy group, an alkoxy group, an alkylthio group, an acyloxy group, an amino group, an alkylamino group, a carbonamide group, a sulfonamide group, a sulfamoylamino group, an oxycarbonylamino group, an oxysulfonylamino group, an ureido group, a thioureido group, an acyl group, an oxycarbonyl group, a carbamoyl group, a sulfonyl group, a sulfinyl group, a sulfamoyl group, a carboxy group or a salt, and a sulfo group or a salt, or a group in which any of these groups are further substituted with any of these groups, a plurality of —$(R^{22})_{m22}$'s may be the same or different, in a case of m21≥2, a plurality of $R^{21}$'s may be the same or different, in a case of m22≥2, a plurality of $R^{22}$'s may be the same or different, in a case of m23≥2, a plurality of $R^{23}$'s may be the same or different, a total number of substituents selected from the group consisting of $R^{21}$, $R^{22}$, and $R^{23}$ is 2 or more and 8 or less, and two or more substituents are electron-withdrawing groups, a total number of substituents selected from the group consisting of $R^{21}$ and $R^{23}$ is 1 or more, at least one substituent selected from the group consisting of $R^{21}$ and $R^{23}$ is an electron-withdrawing group, and the electron-withdrawing group is selected from a halogen atom, a cyano group, an alkoxycarbonyl group, and a carboxy group, at least two of the electron-withdrawing groups are chlorine atoms or cyano groups, and a total number of $R^{22}$ is 1 or more.

2. The composition according to claim 1, wherein a maximum absorption wavelength of the dichroic substance is within a range of 400 to 500 nm.

3. The composition according to claim 1, further comprising:

a liquid crystalline compound.

4. A light absorption anisotropic film which is formed using the composition according to claim 1.

5. A laminate comprising:

a base; and the light absorption anisotropic film according to claim 4 which is provided on the base.

6. The laminate according to claim 5, further comprising:

a λ/4 plate which is provided on the light absorption anisotropic film.

7. An image display device comprising:

the light absorption anisotropic film according to claim 4.

8. A dichroic substance which is represented by Formula (2), and exhibits a CLogP value of 7.0 or greater, (2)

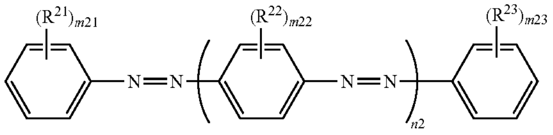

in Formula (2), m21 and m23 each independently represent an integer of 0 to 5, m22 represents an integer of 0 to 4, and n2 represents an integer of 2, and in Formula (2), $R^{21}$, $R^{22}$, and $R^{23}$ each independently represent a substituent, the substituent in $R^{21}$ and the substituent in $R^{23}$ are each independently a trifluoromethyl group, an alkoxycarbonyl group, an alkyl group, an alkenyl group, a heterocyclic group, a halogen atom, a cyano group, a nitro group, a mercapto group, a hydroxy group, an alkoxy group, an alkylthio group, an acyloxy group, an amino group, an alkylamino group, a carbonamide group, a sulfonamide group, a sulfamoylamino group, an oxycarbonylamino group, an oxysulfonylamino group, an ureido group, a thioureido group, an acyl group, an oxycarbonyl group, a carbamoyl group, a sulfonyl group, a sulfinyl group, a sulfamoyl group, a carboxy group or a salt, and a sulfo group or a salt, or a group in which any of these groups are further substituted with any of these groups, a plurality of —$(R^{22})_{m22}$'s may be the same or different, in a case of m21≥2, a plurality of $R^{21}$'s may be the same or different, in a case of m22≥2, a plurality of $R^{22}$'s may be the same or different, in a case of m23≥2, a plurality of $R^{23}$, s may be the same or different, a total number of substituents selected from the group consisting of $R^{21}$, $R^{22}$, and $R^{23}$ is 2 or more and 8 or less, and two or more substituents are electron-withdrawing groups, a total number of substituents selected from the group consisting of $R^{21}$ and $R^{23}$ is 1 or more, at least one substituent selected from the group consisting of $R^{21}$ and $R^{23}$ is an electron-withdrawing group, and the electron-withdrawing group is selected from a halogen atom, a cyano group, an alkoxycarbonyl group, and a carboxy group, at least two of the electron-withdrawing groups are chlorine atoms or cyano groups, and a total number of $R^{22}$ is 1 or more.

* * * * *